United States Patent [19]

Kuney, Jr.

[11] Patent Number: 4,957,335
[45] Date of Patent: Sep. 18, 1990

[54] MICROSPHERE-BASED RETROREFLECTIVE ARTICLES WITH ENHANCED RETROREFLECTIVE BRIGHTNESS

[75] Inventor: Clark G. Kuney, Jr., Hudson, Wis.

[73] Assignee: Minnesota Mining and Manufacturing Company, St. Paul, Minn.

[21] Appl. No.: 358,442

[22] Filed: May 26, 1989

[51] Int. Cl.$^5$ .................. G02B 5/128; G02B 5/136
[52] U.S. Cl. .................................. 350/105; 350/109
[58] Field of Search ............... 350/104, 105, 106, 107, 350/109; 427/162

[56] References Cited

U.S. PATENT DOCUMENTS

| | | | |
|---|---|---|---|
| 2,326,634 | 8/1943 | Gebhard et al. | 88/82 |
| 3,149,016 | 9/1964 | Tung | 161/1 |
| 3,190,178 | 6/1965 | McKenzie | 88/82 |
| 3,700,305 | 10/1972 | Bingham | 350/105 |
| 3,758,192 | 9/1973 | Bingham | 350/105 |
| 3,946,130 | 3/1976 | Tung et al. | 428/325 |
| 3,989,775 | 11/1976 | Jack et al. | 350/105 |
| 4,025,159 | 6/1977 | McGrath | 350/105 |
| 4,213,852 | 7/1980 | Etkin | 209/136 |
| 4,637,950 | 1/1987 | Bergeson et al. | 428/168 |
| 4,678,695 | 7/1987 | Tung et al. | 428/120 |
| 4,726,134 | 2/1988 | Woltman | 40/582 |
| 4,763,985 | 8/1988 | Bingham | 350/105 |

OTHER PUBLICATIONS

McCrone, Walter et al., *Polarized Light Microscopy*, McCrone Research Institute, Chicago, Ill., Jan. 1988.

Primary Examiner—Bruce Y. Arnold
Assistant Examiner—Ronald M. Kachmarik
Attorney, Agent, or Firm—Donald M. Sell; Walter N. Kirn; Robert H. Jordan

[57] ABSTRACT

Microsphere-based retroreflective articles having exceptionally high retroreflective brightness, particularly at divergence angles of up to 0.5° may be made by selection of microspheres having defined combinations of average diameter and average refractive index.

38 Claims, 10 Drawing Sheets

MICROSPHERE-BASED RETROREFLECTIVE ARTICLES WITH ENHANCED RETROREFLECTIVE BRIGHTNESS

Field of Invention

The present invention relates to microsphere-based retroreflective articles, and relates particularly to microsphere-based retroreflective articles wherein the microspheres are air-incident, i.e., exposed-lens or encapsulated-lens constructions.

Background

Microsphere-based retroreflective articles are well known and have been widely used for safety purposes, such as warning emblems on vehicles or hazard warnings on roadways, and for information purposes, such as traffic control. Perhaps the most common form of such articles is retroreflective sheeting, often in flexible form, which is adhered to a substrate, such as an aluminum sign panel or the side of a vehicle. Some other illustrative uses of microsphere-based retroreflective products include pavement markings and coating compositions which can be used to form retroreflective coatings on desired surfaces.

Early microsphere-based retroreflective products were typically of the exposed-lens variety wherein glass microspheres, having air-incident front surfaces and hemispheric reflective layers disposed behind the rear surfaces thereof, were provided on a surface, e.g., a sign on the side of a road. U.S. Pat. No. 2,326,634 (Gebhard et al.) discloses such retroreflective articles.

One drawback of exposed-lens type constructions is that if the surface of the article, e.g., retroreflective sheeting on a road sign, becomes wet, such as by rainfall, the water which is deposited on the front surfaces of the microspheres interferes with desired retroreflection by the sheeting, thereby "blacking out" the affected sheeting. One solution is to provide a cover film disposed in front of the microspheres, typically in substantially no more than tangential contact therewith, so as to prevent deposition of water on the front of the microspheres while retaining their air-incident interface so as to maintain the necessary optical relationships for retroreflection. Such retroreflective articles are sometimes referred to as "encapsulated-lens" type retroreflective articles. U.S. Pat. No. 3,190,178 (McKenzie) discloses such retroreflective articles.

The aforementioned U.S. Pat. No. 2,326,634 teaches "that the refractive index range of approximately 1.70-1.90 is a critical range within which optimum brilliancy results" for the air-incident microspheres of the exposed-lens sheeting disclosed by that patent. Page 1, column 1, lines 37-39. The patent further discloses that microspheres in the range of about 3 to about 50 mils (i.e., about 75 to about 1300 microns) may be used. Page 5, column 1, lines 33-34.

The aforementioned U.S. Pat. No. 3,190,178 teaches that, while the microspheres in encapsulated-lens sheeting should not exceed about 200 microns in diameter, they are preferably no larger than about 75 microns in diameter, and that best results are obtained with microspheres having diameters between about 25 and 75 microns. The reference further teaches that the refractive index of the microspheres should be between about 1.7 and about 2.0. Column 5, line 75 to column 6, line 10.

U.S. Pat. No. 3,946,130 (Tung et al.) discloses that maximum retroreflectivity is obtained in a retroreflective product when all the microspheres in the product have the same predetermined index of refraction such that precise focusing of incident light rays on the reflective surface disposed at the back of the microspheres is obtained. The reference further teaches that "for many types of retroreflective sheeting products, an index of refraction of 1.93 is optimum", column 1, lines 38-46, and that a range of between 1.90 and 1.95 is preferred, column 3, lines 16-17. U.S. Pat. No. 3,149,016 (Tung) discloses that the refractive index of a microsphere can be increased by heat treating and that such increase may be associated with changes in the molecular structure of the glass compound which the microspheres comprise.

Thus, the prior art discloses that microspheres of diameters of up to over 1300 microns having refractive indices of 1.7 to 2.0 or more may be used in air-incident constructions. However, nowhere does the prior art teach that the retroreflective brightness of a microsphere-based retroreflective article can be enhanced through concurrent and optimum selection of the average diameter and average refractive index of the microspheres, or be still further enhanced by additionally selecting microspheres with a specified distribution of sizes.

Summary of Invention

The present invention provides microsphere-based retroreflective articles having exceptional retroreflective brightness, particularly at narrow observation or divergence angles, i.e., observation angles of about 0.25° or less. For instance, one embodiment of an exposed-lens microsphere-based article of the invention provided a retroreflective brightness of over 1300 candela per lux per square meter at an observation angle of about 0.10°. The retroreflective articles provided herein can provide surprisingly high degrees of retroreflective brightness at observation angles of from about 0° up to about 0.5°. A glossary of some of the terms used herein is provided below immediately following the Examples.

It has unexpectedly been found that, in the case of air-incident-type microsphere-based retroreflective articles, retroreflective brightness of the articles is dependent at least in part upon a combination of the the average refractive index of the microspheres, and the average size or diameter of the microspheres. It has been also discovered that the aforementioned retroreflective brightness further depends in part upon the statistical distribution of the size of the microspheres. As discussed herein, these characteristics may be controlled singly or in combination to enhance the brightness of microsphere-based retroreflective articles. Retroreflective articles have been made in accordance with the present invention which provided unprecedented and surprisingly bright retroreflective brightnesses. Insofar as is known, this is the first instance where the criticality of these characteristics and the relationships of such characteristics to retroreflective brightness of a resultant retroreflective sheeting has been recognized.

In accordance with the present invention, microsphere-based retroreflective articles having air-incident microspheres may be made which achieve levels of retroreflective brightness that are surprisingly higher than those previously attained by microsphere-based articles. Because some embodiments of microsphere-based articles of the invention typically also have narrower and more sharply defined divergence profiles than do previously known microsphere-based articles, such retroreflective articles are typically well-suited for use in such applications as the background portions of road signs of which long distance conspicuity coupled with short distance noninteference or glare is desired. Such signs are disclosed in U.S. Pat. No. 4,726,134 (Woltman). The teachings of that patent are incorporated herein by reference.

In brief summary, the invention provides microsphere-based retroreflective articles such as retroreflective sheetings which comprise transparent microspheres having reflectors, e.g., specular, dielectric, or diffuse reflectors, in optical association with the rear surfaces thereof, wherein the front surfaces of the microspheres are substantially air-incident. "In optical association" is used herein to refer to arrangement wherein the reflectors are disposed relative to the rear surface of the associated microspheres in such a manner that the microsphere and reflector can function as a retroreflective element. For instance, in the case of aluminum vapor coats, a common type of reflector, the reflector is typically located directly on the rear surface of the microsphere, whereas in the case of some diffuse reflectors such as binder layers containing reflective particles, the particles themselves may be spaced somewhat from the rear surface of the microsphere by the binder material. The retroreflective articles provided herein may typically be made in exposed-lens or encapsulated-lens embodiments. The microspheres in many embodiments of the invention will be arranged in a monolayer, as is the typical structure of retroreflective sheeting. In many embodiments of the invention, substantially all of the microspheres will be oriented in substantially the same direction, i.e., in uniform optical orientation, such that the front surfaces of the microspheres are oriented on the same axis and the rear surfaces thereof, with which the reflectors are in optical association, are oriented on the same axis. Typically, when the microspheres are arrayed in this uniform manner, the highest retroreflective brightness is achieved. In other embodiments of the invention, however, the microspheres may be arranged in other than a monolayer structure and/or they may not be substantially all oriented in the same direction, i.e., they may be randomly oriented, such as might result in a retroreflective coating formed from a liquid composition.

The articles of the invention differ from previously known microsphere-based retroreflective articles in that the microspheres are selected to have an average refractive index of at least about 1.915 and an average diameter of at least about 75 microns, wherein the average refractive index and an average diameter correspond to the coordinates of a point within Region D of FIG. 5, preferably having a diameter percent range of about 30 percent or less. The terms "refractive index" and "index of refraction" are used herein to refer to the "Becke Line" refractive index or index of refraction. In order to achieve higher retroreflective brightness, the microspheres preferably have an average refractive index of at least about 1.915 and an average diameter of at least about 75 microns, wherein the average refractive index and average diameter correspond to the coordinates of a point within Region C of FIG. 5, more preferably within Region B of FIG. 5, and most preferably, to the coordinates of a point within Region A of FIG. 5.

Furthermore, in order to maximize the peak retroreflective brightness of the resultant article and to impart a more clearly defined, typically narrower divergence profile to the article, the microspheres are preferably selected so as to have a diameter percent range of less than about 30, more preferably less than about 20, most preferably less than about 10, percent by weight. It has been discovered that selection of microspheres according to size so as to reduce the diameter percent range from about 40 percent to about 10 percent or less can provide an increase of about 10 to about 15 percent in retroreflective brightness between two microsphere-based retroreflective articles made with microspheres having substantially equal average diameters. As will be discussed below, it has been observed that the ideal average diameter is dependent in part upon both the viewing geometry at which maximum retroreflective brightness of the resultant retroreflective article is desired and the type of reflectors which are in optical association with the microspheres in the article.

In instances where a wide divergence profile is desirable, i.e., to maximize retroreflective brightness at all viewing angles, selection of microspheres with higher diameter percent ranges, e.g., about 30 percent or more, will typically be desired.

Due to the unexpected increase in retroreflective brightness achieved herein, the present invention can provide many advantages. For instance, in accordance with the present invention, microsphere-based retroreflective sheetings may be made which achieve brightnesses which were heretofore unattained by microsphere-based sheetings. If desired, because the microspheres disclosed herein are individually brighter than those previously utilized, sheetings may be made having lower microsphere density, thereby reducing the cost for microspheres and reflectors therein while yet achieving substantially equivalent or even increased retroreflective brightness. The present invention also makes possible the optimization of other properties of a retroreflective article, e.g., cover film toughness, cover film delamination resistance, sheeting whiteness, etc., which might otherwise incur an undesirable reduction of retroreflective brightness of the resultant retroreflective article. In accordance with the present invention, such other properties of microsphere-based retroreflective articles may be optimized while achieving substantially equivalent or even improved retroreflective performance. Another advantage of the articles provided herein is that they may offer narrow divergence profiles of high brightness, and thus may be used in applications where narrow observation angularity of retroreflective response is desired. Other advantages which are provided by the invention will become apparent to those skilled in the art of retroreflective articles.

Brief Description of Drawing

The invention will be further explained with reference to the drawing, wherein:

FIG. 3b is a plan view of the encapsulated-lens embodiment shown in FIG. 3a;

These figures, which are idealized, are not to scale and are intended to be merely illustrative and non-limiting.

Detailed Description of Invention

Figure 1:
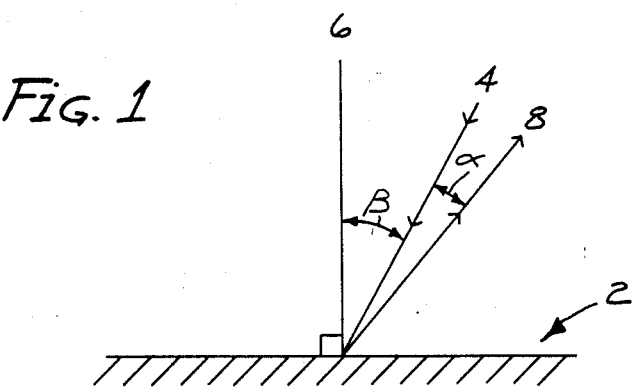
FIG. 1 is a schematic diagram used to illustrate the nature of retroreflection.

Reference is made to FIG. 1 to illustrate the nature of retroreflection. Shown therein is retroreflective article 2, a retroreflective article being one which reflects a substantial portion of the light incident thereto substantially back toward the source of the light. A ray or pencil of rays of light 4 is shown coming from a distant source such as a vehicle headlight (not shown) and striking retroreflective article 2 at entrance angle $\beta$ (the angle between incident ray 4 and normal 6 to article 2). If an ordinary mirror were used, producing specular reflection, the emergent or reflected rays would leave the reflector at essentionally the same angle, but on the other side of the normal (not shown). If a diffusing surface were used, emergent or reflected rays would go off indiscriminately (not shown) in many directions and only a small fraction would return to the source. However, with retroreflection, there is a directionally ordered or collimated reflection such that a cone of brilliant light is returned substantially toward the source. The axis of the cone is substantially the same as the axis of incident ray or incident rays 4. By "cone of brilliant light", it is meant that the intensity of light within the cone is greater than would be the case where diffuse reflection occurs. For a particular retroreflective article 2, a cone of light may be so reflected only where the entrance angle $\beta$ of ray or rays 4 does not exceed a certain value. The property concerning the relative magnitude of entrance angles, i.e., $\beta$ angles, at which a retroreflective article will reflect such a cone of brilliant light is sometimes referred to as entrance angularity.

That retroreflection is in the form of a cone of light is critical where the detector is not on the same precise axis as the source of the light. For instance, it is usually intended that the driver of a vehicle detect or see the light emitted from the headlights of his vehicle which is retroreflected by a road sign. In that instance, if the retroreflective surface or sign is perfect in direction of reflection, with incident light being reflected only precisely toward its source, i.e., the headlights, the sign would have little utility. There should be an expansion or coning out of retroreflected light rays in order that persons near, but off, the axis of the incident light may take advantage of the retroreflector. This expansion should not be excessive, however, or the retroreflective brightness will be diminished because of diffusion of light outside the useful range or cone. The expansion results from the deviation of light rays emergent from the retroreflector along the axis of incident light. The reflected deviation of a particular ray 8 from incident ray 4 is illustrated in FIG. 1. The acute angle between incident rays 4 and emergent ray 8, labeled here as $\alpha$, is known as the divergence angle or observation angle. In the case of road or highway signs, narrow observation angles correspond to viewing the sign from great distances and larger observation angles correspond to viewing the sign from shorter distances. For instance, for a typical automobile, an observation angle (i.e., divergence angle between the driver and headlight on the driver's side) of about 0.1° corresponds to a distance of about 1200 feet (365 meters) from the sign, whereas an observation angle of about 0.3° corresponds to a distance of about 400 feet (120 meters).

For ease of understanding, the following discussion is specifically directed to retroreflective sheetings of the invention, perhaps the most common form of retroreflective articles. It should be understood, however, that other embodiments of microsphere-based retroreflective articles may be made in accordance with the teachings of the present invention. For example, retroreflective coatings and liquid compositions for forming same may be made in accordance with the present invention. It should be further understood that retroreflective articles of the invention need not be substantially planar nor do the microspheres used therein need to be arranged in substantially a monolayer in order for the principles of the present invention to be practiced.

As discussed above, the microsphere-based retroreflective sheetings of the invention comprise transparent microspheres having reflectors, e.g., specular or diffuse reflectors, in optical association with the rear surfaces thereof, wherein the microspheres are air-incident. The microspheres have an average refractive index and an average diameter corresponding to the coordinates of a point within Region D of FIG. 5. In order to achieve higher retroreflective brightness, the microspheres preferably have an average refractive index and an average diameter corresponding to the coordinates of a point within Region C of FIG. 5, more preferably within Region B of FIG. 5, and most preferably, the microspheres have an average refractive index and an average diameter corresponding to the coordinates of a point within Region A of FIG. 5. Furthermore, the microspheres preferably have a diameter percent range of less than about 30, more preferably less than about 20, most preferably less than about 10, percent by weight. It has been discovered that maximum retroreflective brightness is achieved in an article wherein the microspheres have an average refractive index and an average diameter corresponding to the coordinates of a point within Region A of FIG. 5 and have a diameter percent range of less than 10.

Figure 2:
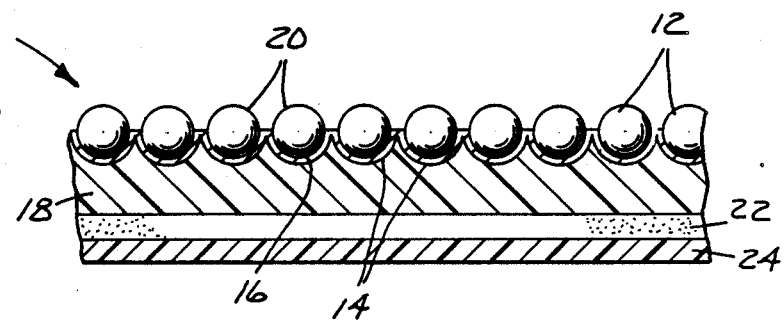
FIG. 2 is a cross-sectional illustration of a portion of an exposed-lens embodiment of retroreflective sheeting of the invention.

Illustrative examples of retroreflective sheetings of the invention include exposed-lens and encapsulated-lens embodiments as shown in FIGS. 2 and 3, respectively. In both embodiments, the microspheres are air-incident.

Shown in FIG. 2 is portion 10 of exposed-lens type retroreflective sheeting of the invention which comprises a monolayer of microspheres 12 each of which has specular reflector 14, such as a dielectric mirror of the type disclosed in U.S. Pat. No. 3,700,305 (Bingham), on, i.e., in optical association with, rear surface 16 thereof. Microspheres 12 are partially embedded in binder layer 18. Front surfaces 20 of microspheres 12 protrude from binder layer 18 and are air-incident. Sheeting 10, if desired, typically has layer 22 of adhesive on the rear side thereof to permit application of sheeting 10 to a substrate (not shown), e.g., an aluminum panel for use as a traffic sign. For protection, adhesive layer 22 is typically covered by release liner 24 during shipping and prior to application to final substrate. The aforementioned U.S. Pat. No. 2,326,634 discloses exposed-lens type retroreflective sheetings.

Figure 3A:
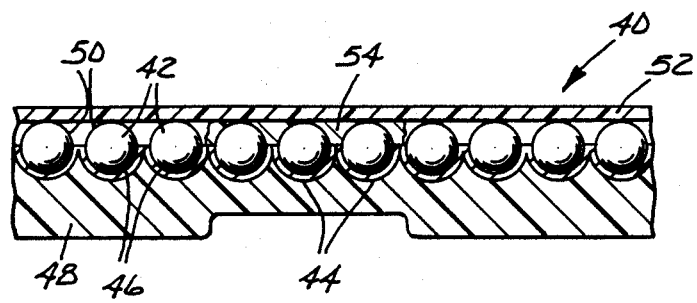
FIG. 3a is a cross-sectional illustration of a portion of an encapsulated-lens embodiment of the invention.

FIG. 3a shows portion 40 of an encapsulated-lens sheeting of the invention which comprises a monolayer of microspheres 42 each of which has specular reflector 44, such as a layer of vapor-coated aluminum, on rear surface 46 thereof. Microspheres 42 are partially embedded in binder layer 48 with front surfaces 50 protruding therefrom. Sheeting 40 further comprises cover film 52 which is disposed in front of microspheres 42 and is sealed to the remainder of sheeting 40 along a network of intersecting bonds 54 with binder layer 48 wherein binder layer 48 has been forced into adherent contact with cover film 52.

Figure 3B:
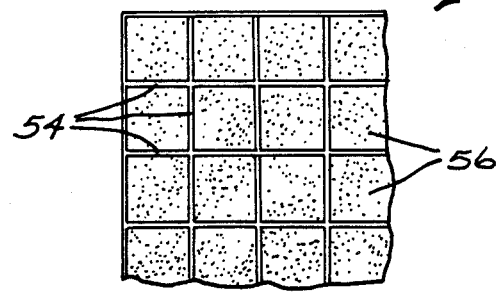

FIG. 3b is a plan view of the encapsulated-lens sheeting shown in FIG. 3a. In FIG. 3b, a portion of the network of intersecting bonds 54 and a number of cells 56, each of which may typically contain several hundred or several thousand individual microspheres, are shown. Although the cells in encapsulated-lens embodiments of the invention will typically contain several hundred or several thousand microspheres, sheetings may be made wherein the microspheres are essentially individually surrounded by the network of intersecting bonds between the binder layer and the cover film. U.S. Pat. No. 4,678,695 (Tung et al.) discloses encapsulated-lens sheeting wherein the microspheres are substantially individually surrounded by such networks of bonds which can provide very high delamination resistance.

In encapsulated-lens embodiments of the invention, as in other encapsulated-lens type sheetings, the front surfaces of the microspheres within the cells are covered by the cover film such that water or other foreign materials which may be deposited upon the front of the sheeting will not contact microspheres themselves. In such sheetings, the front surfaces of the microspheres may be in contact with the inside of the cover film, typically no more than tangential contact therewith, or the cover film may be disposed from the front surfaces of the microspheres so as to have essentially no contact therewith. The microspheres in encapsulated-lens type sheetings of the invention are considered herein to be air-incident, even where they are in limited contact with the cover film or where the cells within the sheeting are filled with gases other than air, because the optical interface at the front surfaces of the microspheres is essentially the same as that of exposed-lens type constructions. Examples of encapsulated-lens type retroreflective articles are disclosed in the aforementioned U.S. Pat. No. 3,190,178 and in U.S. Pat. No. 4,025,159 (McGrath) which discloses an improved manner of sealing the cover film to the binder layer of the retroreflective sheeting. The teachings of these patents are incorporated herein by reference.

This invention relates to the discovery of a relationship between the characteristics of average refractive index and average diameter, and a further relationship between those characteristics and the characteristic of distribution of diameters, of the microspheres in a microsphere-based retroreflective article and the retroreflective brightness provided by the article. Insofar as is known, the importance of these relationships and the advantages attained by control thereof were heretofore unknown. It has been found, unexpectedly, that the magnitude of retroreflective brightness of air-incident microsphere-based retroreflective articles, particularly at divergence angles of up to about 0.5°, is maximized when the microspheres have an average refractive index of at least about 1.915 and an average diameter of at least about 75 microns, wherein the average refractive index and an average diameter corresponding to the coordinates of a point within Region D of FIG. 5, preferably having a diameter percent range of about 30 percent or less. In order to achieve higher retroreflective brightness, the microspheres preferably have an average refractive index of at least about 1.915 and an average diameter of at least about 75 microns, wherein the average refractive index and an average diameter correspond to the coordinates of a point within Region C of FIG. 5, more preferably within Region B of FIG. 5, and most preferably, the microspheres have an average refractive index and an average diameter corresponding to the coordinates of a point within Region A of FIG. 5. For instance, in one embodiment of the invention, an exposed-lens sheeting wherein the microspheres had an average refractive index of about 1.951, an average diameter of about 148 microns, and a diameter percent range of about 13 percent had a retroreflective brightness of about 1384 candela per lux per square meter at an observation angle of about 0.10° whereas a similar sheeting made from microspheres having an average refractive index of about 1.912, an average diameter of about 62 microns, and a diameter percent range of about 44 percent had a brightness of about 626 candela per lux per square meter at the same observation angle.

It has further been found that the divergence profile of a particular article of the invention is more clearly defined and may be more easily predicted in accordance with the teachings of the present invention, and that the maximum retroreflective brightness of the article is higher, if, in addition to having the specified average refractive index and average diameter, the microspheres reside in a statistically narrow size distribution about the specified averages, e.g., preferably a diameter percent range of about 30 percent or less, more preferably less than about 20, and most preferably less than about 10 percent. While we do not wish to be bound by this theory, it is believed that if the microspheres utilized in a retroreflective article reside in a narrow diameter percent range, the optical properties of the individual microspheres are more uniform and consistent, thereby providing more consistent, therefore more easily controlled, retroreflective performance of the subject retroreflective article.

Conventional sheetings, in addition to typically being made with microspheres having lower average refractive index and smaller average diameter than retroreflective articles of the invention, typically have substantially wider distributions of refractive index and diameter, e.g., a diameter percent range of between about 35 and 45 percent or more. Due in part to such wider diameter percent ranges, individual microspheres within such articles vary more widely in optical properties, thereby preventing the enhanced retroreflective performance which is achieved by the present invention. For instance, ULTRALITE Brand Reflective Sheeting, available from Seibu Co., is believed to contain microspheres having an average diameter of about 69 microns, an average refractive index of about 1.911, and a diameter percent range of about 29.

Thus, when making a retroreflective article of the invention, the microspheres used therein should be precisely chosen for desired average refractive index and average diameter as discussed herein, with the selected group of microspheres preferably having a diameter percent range of less than about 30 percent, more preferably less than about 20 percent, and most preferably less than about 10 percent to provide a retroreflective article having exceptional brightness at narrow divergence angles.

The refractive index of microspheres is determined in part by the composition of the materials from which the microspheres are made, and the manner of manufacture used, e.g., the thermal history during manufacture. The aforementioned U.S. Pat. No. 3,946,130 discloses a number of suitable compositions from which microspheres for use in articles of the present invention may be made. That patent also discloses that inter-microsphere index of refraction differences may arise from the different rates of volatilization and removal of contaminants during the process of forming of the microspheres, particularly where the microspheres are of varying diameter.

One known process utilized when forming microspheres is flame forming or flame fusion. Multiple passes through the process when forming microspheres will typically yield microspheres having higher indices of refraction than those of microspheres formed from the same initial glass composition with a single flame forming.

The refractive index of microspheres can also be altered by other treatments. For instance, the refractive index of microspheres heated to above their glass transition temperature, but not to their characteristic crystallization temperature is typically increased. Such processes, which are sometimes referred to as heat treating, also typically increase the clarity of the microspheres and reduce undesirable defects and discontinuities therein, e.g., by causing dissipation of volatile contaminants therefrom. U.S. Pat. No. 3,149,016 (Tung) discloses such a process.

A combination of multiple flame fusions and subsequent heat treatment can be used to increase the average refractive index of a group of microspheres and also to reduce variations in refractive index and other optical properties between and within individual microspheres. The following are some typical results:

| Number of Flame Fusions | Index Before[1] | Index After[2] |
|---|---|---|
| 1 | 1.925 | — |
| 2 | 1.940 | 1.955 |
| 3 | 1.949 | 1.959 |
| 4 | 1.950 | 1.965 |
| 5 | 1.953 | 1.967 |

[1] Refractive index before heat treating
[2] Refractive index after heat treating These results are believed to indicate that an apparent end point is approached for a given initial glass composition.

The advantages of the present invention may be obtained with microspheres of many different compositions in so long as the microspheres have the refractive index properties discussed herein.

The present invention further relates to the discovery that the retroreflective properties of microsphere-based articles are also dependent in part upon the average size of the microspheres therein. It has been found that, for air-incident type microsphere-based retroreflective articles, maximum retroreflective brightness is achieved when the microspheres have an average refractive index of at least about 1.915 and an average diameter of at least about 75 microns, wherein the average refractive index and average diameter correspond to the coordinates of a point within Region D of FIG. 5. In order to achieve higher retroreflective brightness, the microspheres preferably have an average refractive index of at least about 1.915 and an average diameter of at least about 75 microns, wherein the average refractive index and an average diameter correspond to the coordinates of a point within Region C of FIG. 5, more preferably within Region B of FIG. 5, and most preferably, have an average refractive index and an average diameter correspond to the coordinates of a point within Region A of FIG. 5. It is believed that, in the case of such embodiments or articles of the present invention as exposed-lens and encapsulated-lens sheetings, for brightest retroreflection at narrow divergence angles, the ideal refractive index is about 1.940.

It has been observed that the ideal average diameter is dependent in part upon both the viewing geometry, i.e., the intended observation or divergence angle, at which the resultant retroreflective article is likely to be used and the type of reflector which is in optical association with the rear surfaces of the microspheres in the article. It has also been observed that the ideal average diameter is somewhat larger for articles wherein the microspheres have diffuse reflectors than for those wherein the microspheres have specular reflectors in optical association therewith. These observations are tabulated as follows:

| Observation Angle (degrees) | Average Microsphere Diameter* (microns) | |
|---|---|---|
| | Reflector: Specular | Diffuse |
| 0.00 | 161 | 164 |
| 0.05 | 149 | 157 |
| 0.10 | 136 | 150 |
| 0.15 | 124 | 143 |
| 0.20 | 111 | 136 |
| 0.25 | 98 | 129 |

*Average diameter at which retroreflective brightness is maximized for the indicated Observation Angle.

While we do not wish to be bound by this theory, it is believed that the optimum average microsphere diameter is larger when the reflector is diffuse than when the reflector is specular is due to a difference in the mechanism by which incident light is focused by the microsphere and reflected by the reflector in optical association with the rear surface thereof.

As is average refractive index, average diameter and size distribution of microspheres are determined in part by the manner in which the microspheres are manufactured. Once formed, microspheres can be sorted, e.g., by such techniques as screen sifting or air classification techniques, to provide a supply of microspheres having the desired average diameter and size distribution. For instance, U.S. Pat. No. 4,213,852 (Etkin) discloses a method for sorting microspheres according to size.

It was only with this invention, however, that the importance of sorting microspheres according to average size and distribution of size with sufficient precision to attain the diameter percent ranges taught herein to achieving substantially increased retroreflective brightness was first realized.

Preferably the microspheres used in articles of the present invention are substantially spherical in shape in order to provide the most uniform and efficient retroreflection. The microspheres used in articles of the present invention are preferably substantially transparent, at least to the wavelengths of light for which retroreflection is desired, so as to minimize the amount of light they absorb, thereby maximizing the amount of light which can potentially be retroreflected by retroreflective articles of the invention. In addition, the microspheres used herein are preferably substantially optically uniform, i.e., they are preferably substantially free of bubbles and other internal discontinuities, as such discontinuities may tend to interfere with desired retroreflection.

Microspheres used in articles of the present invention are typically made from glass. Glass microspheres are typically preferred because they typically cost less, are hard, and exhibit high durability, the latter two characteristics being particularly important in the case of exposed-lens embodiments of the present invention. Illustrative classes of useful compositions include barium titanates and lead silicates, both typically with modifiers. It should be understood, however, that articles of the present invention may be made with microspheres of many different compositions in so long as they have the refractive index and size properties discussed herein.

As discussed above, the microspheres of retroreflective articles of the invention have reflectors in optical association with the rear surfaces thereof. Among the variety of materials which may be used for this purpose are specular reflectors, typically formed from vacuum-deposited or vapor-coated, or chemically-deposited silver or aluminum. Aluminum or silver vapor-coatings are typically preferred, because they tend to provide the highest retroreflective brightness. The reflective color of silver coatings is often preferred to that of aluminum coatings, but an aluminum vapor coat is normally used for outdoor applications, because silver reflective coatings typically suffer more severe degradation in outdoor exposure than do aluminum coatings. The aforementioned U.S. Pat. No. 3,700,305 (Bingham) discloses the use of dielectric coatings as reflectors. The teachings of that patent are incorporated herein by reference. Such reflectors, which are typically made up of two or more layers of alternating refractive index, may be used in retroreflective articles of the invention.

Diffuse reflectors may also be used in retroreflective articles of the invention if desired. For instance, the microspheres may be partially embedded in a preferably substantially transparent binder layer which contains reflective pigment particles, e.g., titanium dioxide, metal particles, or nacreous particles, at least in that portion of the binder adjacent to the rear surfaces of the microspheres, i.e., in optical association therewith. In such instances, the particles are typically flakes of the subject material which are preferably oriented substantially tangentially with the proximate portion of the rear surface of the microsphere. U.S. Pat. No. 3,758,192 (Bingham) discloses retroreflective articles wherein the binder material contains nacreous flakes.

U.S. Pat. No. 4,763,985 (Bingham) discloses a retroreflective article wherein a dielectric mirror and nacreous flakes in a binder material are used in combination as a reflector system. The teachings of that patent are incorporated herein by reference. Such reflectors may be used in some embodiments of the invention if desired.

Typically, microsphere-based retroreflective articles which are otherwise similar in construction, i.e., are made with microspheres of the same dimensions and properties, which are made with specular reflectors, two layer dielectric reflectors, or diffuse reflectors, will provide relative retroreflective performance of about 100 units, about 35 to about 45 units, and about 5 to about 15 units, respectively.

As discussed above, it has been observed that the ideal average diameter for microspheres with diffuse reflectors is slightly larger than that for microspheres with specular reflectors. While we do not wish to be bound by this theory, it is believed that this phenomenon may result from the mechanism by which incident light is focused by the microsphere and the manner in which it is reflected by the diffuse reflector. It is believed that spherical aberrations in the manner in which light is refracted by the microspheres may also be a factor.

The binder layer typically comprises a durable polymeric material which, as will be understood, provides good adhesion to the microspheres and preferably also to the other elements of the retroreflective article, e.g., the reflectors and components thereof (e.g., pigment or metal flakes) cover film, if any, etc. In many instances, the binder layer is flexible, permitting the resultant sheeting to be bent and formed during handling and shaped into a non-planar final configuration. The binder layer may further comprise a whitening agent such as a pigment, e.g., titanium dioxide, to increase the overall whiteness of the article. Alternatively, however, the binder layer may comprise another coloring agent or combinations of coloring agents selected to impart a different color thereto, e.g., pigments or dyes which impart black, blue, or red color. Some illustrative examples of binder materials which can be used in retroreflective articles of the invention include thermoplastic, heat-activated, ultraviolet-cured, and E-beam-cured polymer systems.

Additionally, the binder layer may further comprise one or more protective agents, e.g., weathering agents, stabilizers, ultraviolet absorbers, antioxidants, energy quenchers, etc., adhesion promoters, etc. selected in view of the properties desired for the ultimate application for which the sheeting is being prepared.

As described above, in some embodiments, retroreflective articles of the invention may comprise a cover film disposed in front of the microspheres, such as is disclosed in the aforementioned U.S. Pat. Nos. 3,190,178 and 4,025,159. Cover films of air-incident microsphere-based retroreflective sheetings are typically secured to the sheeting by a network of intersecting bonds of binder material from the binder layer which form hermetically sealed cells within which microspheres, typically large numbers thereof, e.g., thousands, are isolated from similar surrounding cells. U.S. Pat. No. 4,025,159 (McGrath) teaches an improved version of an encapsulated-lens type sheeting in which improved adhesion of the binder layer to the cover film is obtained through the use of curable binder layer materials. Alternatively, individual microspheres may be surrounded by the intersecting network of bonds of binder material as disclosed in U.S. Pat. No. 4,678,695 (Tung). The teachings of each of these patents are incorporated herein by reference.

Cover films are typically weatherable, highly transparent films. Depending in part upon the ultimate application for which the retroreflective article is being made, cover films may be flexible or rigid, scratch-resistant, shock-resistant, extensible or inextensible, etc. Examples of some materials from which cover films are sometimes made include polymethylmethacrylate, polyethylene terephthalate, cellulose acetate, cellulose acetate butyrate, polycarbonate, vinyl butyrate, polyesters, acrylates, nylons, polyvinylchlorides, polyurethanes, and others. U.S. Pat. No. 4,637,950 (Bergeson et al.) discloses biaxially-oriented cover films which comprise two different polymeric phases and provide improved delamination resistance. The teachings of that patent are incorporated herein by reference.

Cover films may further comprise one or more weathering agents, stabilizers, antioxidants, energy quenchers, etc. in view of the properties desired for the ultimate application for which the sheeting is being prepared. Ultraviolet absorbers may be incorporated into the cover film both for its own protection and to protect the underlying elements of the retroreflective sheeting. In addition, one or more coloring agents may be included in the cover film to impart desired color to the resultant product. Such coloring agents are typically dyes or other substantially transparent agents so as to maintain the typically desired highly transparent nature of the cover film.

Referring to FIG. 2 again, if desired, optional adhesive layer 22 may be applied to the rear side of binder layer 18 of sheeting 10. Adhesive layer 22 enables sheeting 10 to be adhered to a desired surface such as a traffic barrier or sign (not shown). As will be understood, the selection of adhesive 22 is dependent in part upon the characteristics of the desired substrate, the conditions under which application of sheeting 10 is expected to be made, and the conditions to which the applied bond is expected to be subjected. Some illustrative examples of types of adhesives which may be used include pressure-sensitive adhesives, heat-activated adhesives, and actinicly cured adhesives. In many instances, adhesive layer 22 will be covered by optional protective release liner 24 prior to application.

Figure 4:
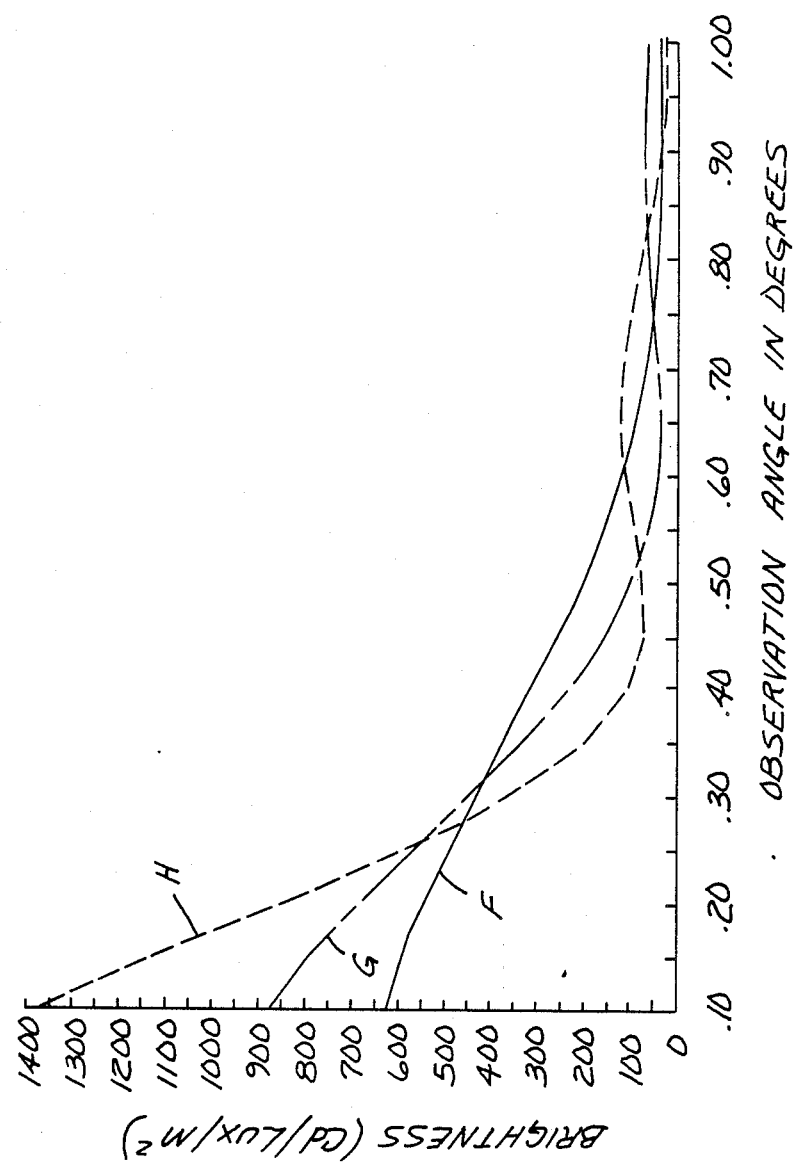
FIG. 4 is an illustrative graphical comparison of the relative divergence profiles of two different embodiments of retroreflective articles of the invention and that of a conventional microsphere-based retroreflective sheeting.

FIG. 4 is a graphical comparison of the relative divergence profiles of two embodiments of retroreflective articles of the invention (curves G and H) and a conventional microsphere-based retroreflective sheeting (curve F), wherein retroreflective brightness is plotted on the "y" axis and divergence angle is plotted on the "x" axis. As shown here, some embodiments of the invention may be made to maximize retroreflective brightness at low divergence angles (curve H) and others (curve G) may be made which are brighter than conventional retroreflective sheetings over somewhat wider divergence angles.

The embodiments shown as curve H, which exhibit exceptional brightness at low divergence angles, would be well-suited for use as the background material for variable contrast roadway signs as disclosed in the aforementioned U.S. Pat. No. 4,726,134.

The increased brilliance of retroreflection which is provided by the present invention is also illustrated in FIGS. 6–9. These FIGS. are graphical illustrations of the effects of index of refraction and average diameter of microspheres upon the retroreflective brightness of retroreflective articles made with such microspheres at divergence angles of 0.10°, 0.15°, 0.20°, and 0.25°, respectively. The derivation of these Figures is discussed in Example 2 below.

As previously mentioned, the present invention provides many advantages. For instance, retroreflective articles made using microspheres in accordance with the teachings herein, may achieve brightnesses which were heretofore unattainable by microsphere-based sheetings. If desired, because the microspheres disclosed herein are individually brighter than those previously available, sheetings may be made having lower microsphere density, thereby reducing the cost for microspheres and reflective coatings while yet achieving substantially equivalent or even improved retroreflective brightness or performance.

The present invention also makes possible the optimization of other performance characteristics, e.g., cover film toughness, delamination resistance, etc., while achieving substantially equivalent or even improved retroreflective performance without experiencing the reduction in brightness associated with the improvement in the other performance characteristic. For instance, the density of microspheres in an encapsulated-lens sheeting embodiment of the invention may be reduced to improve the adhesion of the binder layer to the cover film or to increase the proportion of the whitened binder layer which is visible surrounding microspheres to increase the overall whiteness of the sheeting, yet in accordance with the present invention the sheeting can still achieve high levels of retroreflective brightness. In other instances, a cover film may be made with a material which is tougher than alternate materials which could be used to make cover films, but which has a lower transmissivity than those alternate materials, because the increased retroreflective brightness of the microspheres provided by the present invention tends to offset or even overcome the reduction in retroreflective brightness caused by the lower transmissivity of the tougher cover film.

Microsphere-based retroreflective articles of the invention have been made with specular reflectors that have an "exposed-lens retroreflective brightness" of at least about 800 candela per lux per meter$^2$ at one or more divergence angles of less than about 0.20°, and in some instances articles have been made which have such brightnesses of at least about 1000 or even at least about 1300 candela per lux per meter$^2$ at one or more such divergence angles. The term "exposed-lens retroreflective brightness" is used herein to refer to the retroreflective brightness of a microsphere-based article measured with no cover film disposed in front of the front surfaces of the microspheres and is used as a way to normalize or consistently express the retroreflective performance of different articles without any error due to different cover film properties.

In addition to providing exceptional retroreflective brightness, another advantage of microsphere-based retroreflective sheetings of the invention is that they offer narrow divergence or observation profiles of high brightness, making such sheetings useful where narrow divergence of retroreflection is desired.

Figure 11:
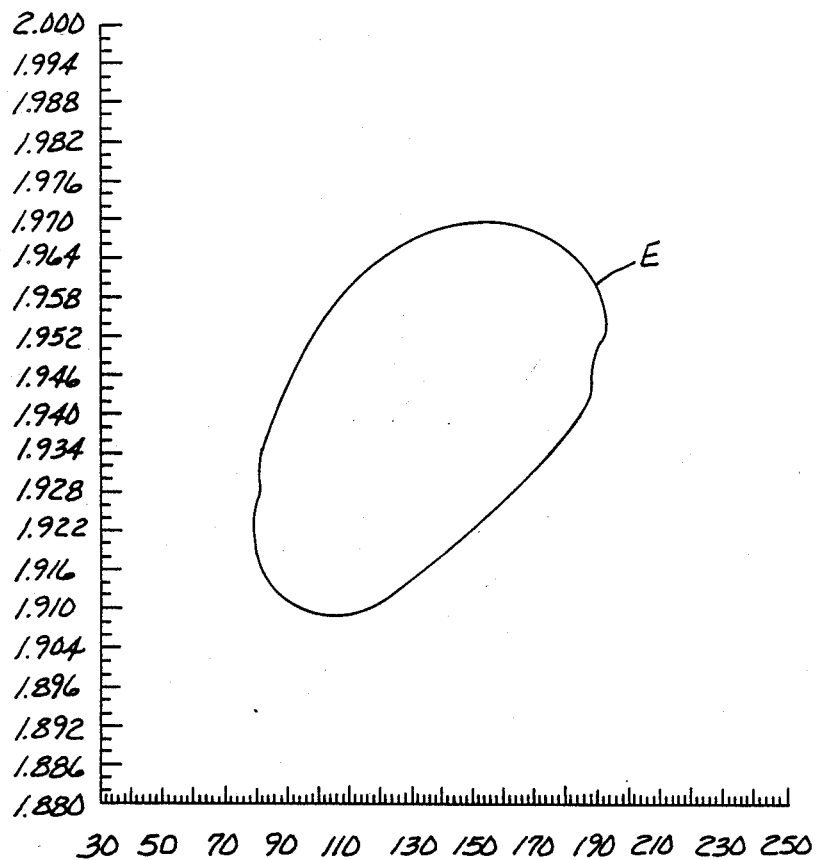
FIG. 11 is a graph showing the average index of refraction and and average diameter of the microspheres in some embodiments of retroreflective articles of the invention and which currently ends the line.

FIG. 11 illustrates Region E wherein reside the coordinate average diameter and average index of refraction of certain useful embodiments of the invention which provide at least about 75 percent of maximum retroreflective brightness.

Figure 10:
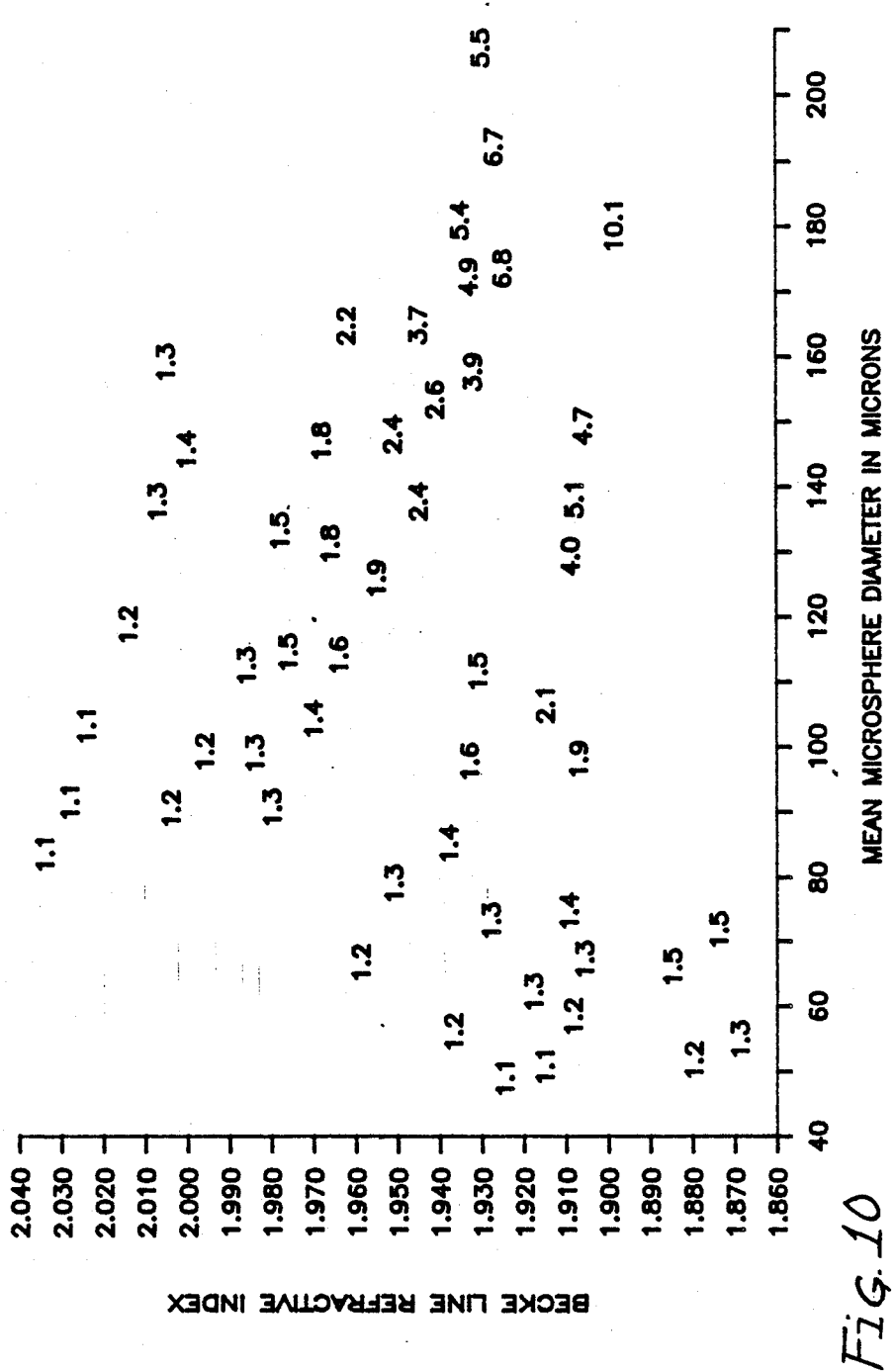
FIG. 10 is a graphical illustration of the brightness ratio of the indicated microspheres between divergence angles of 0.10° and 0.25° from FIGS. 6 and 9, respectively.

Other useful embodiments of the invention include variable contrast signs such as are disclosed in the aforementioned U.S. Pat. No. 4,726,134. The present invention provides retroreflective products which are of high utility for use in the background portions of such signs, i.e., the portions which desirably provide high retroreflective brightness at small observation angles which correspond to long viewing distances, but which are relatively less bright with respect to the legend at wider observation angles which correspond to close approach to the sign so as to increase the contrast between legend and background portions of the sign. FIG. 10, which illustrates the ratio of retroreflective brightness of representative retroreflective articles at divergence angles of 0.1° and 0.25°, illustrates the relative utility of a variety of microspheres for use in the background portions of variable contrast signs such as are disclosed in that patent. From inspection of this Figure and the data in Tables 2 and 3 below, one skilled in the art can see that such a variable contrast sign can be made which has a background area and a legend area wherein the background area comprises transparent microspheres having reflectors in optical association with the rear surfaces thereof, wherein the microspheres are air-incident, and have an average diameter between about 110 and about 200 microns and an average refractive index between about 1.915 and about 1.950. It will be understood that the optimum combination of size and refractive index of the microspheres used in the background portion will depend upon the viewing geometry of the location where the resultant sign is to be lcoated.

Microsphere-based retroreflective articles of the invention have been made with diffuse reflectors that have an "exposed-lens retroreflective brightness" of at least about 30 candela per lux per meter$^2$ at one or more divergence angles of less than about 0.20°, and in some instances such articles have been made which have brightness of at least about 45 candela per lux per meter$^2$ at such angles.

In accordance with the present invention, it is expected that microsphere-based retroreflective articles of the invention can be made with dielectric reflectors that have an "exposed-lens retroreflective brightness" of at least about 300 candela per lux per meter$^2$ at one or more divergence angles of less than about 0.20°, and that in some instances such articles could be made which have brightnesses of at least about 400 candela per lux per meter$^2$ at such angles.

Figure 5:
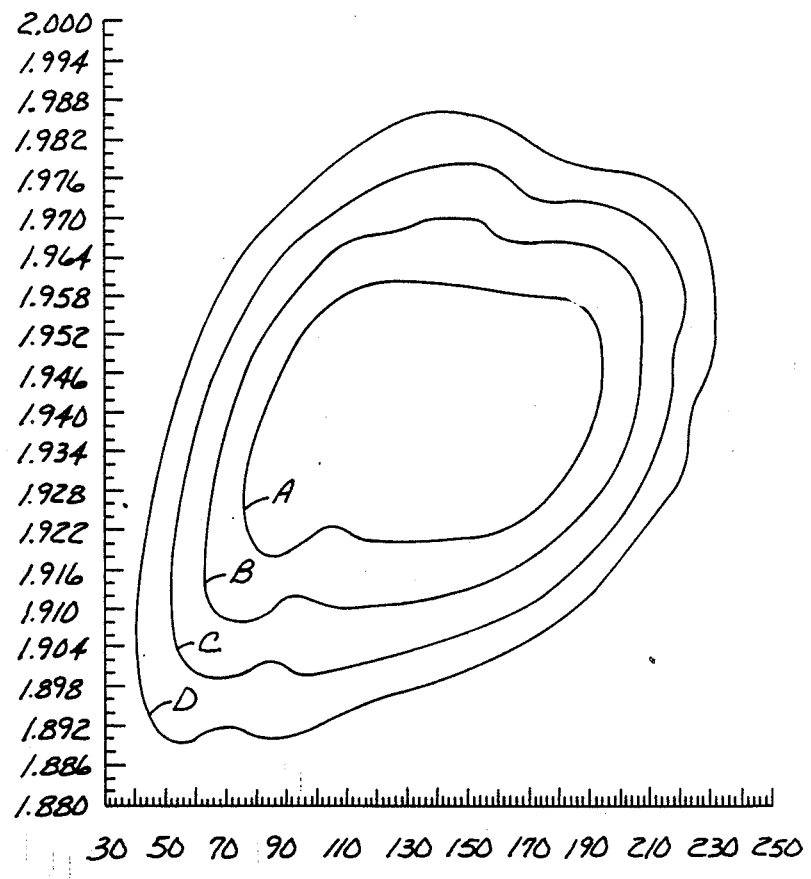
FIG. 5 is a graph showing the average index of refraction and average diameter of the microspheres in retroreflective articles of the invention.
Figure 6:
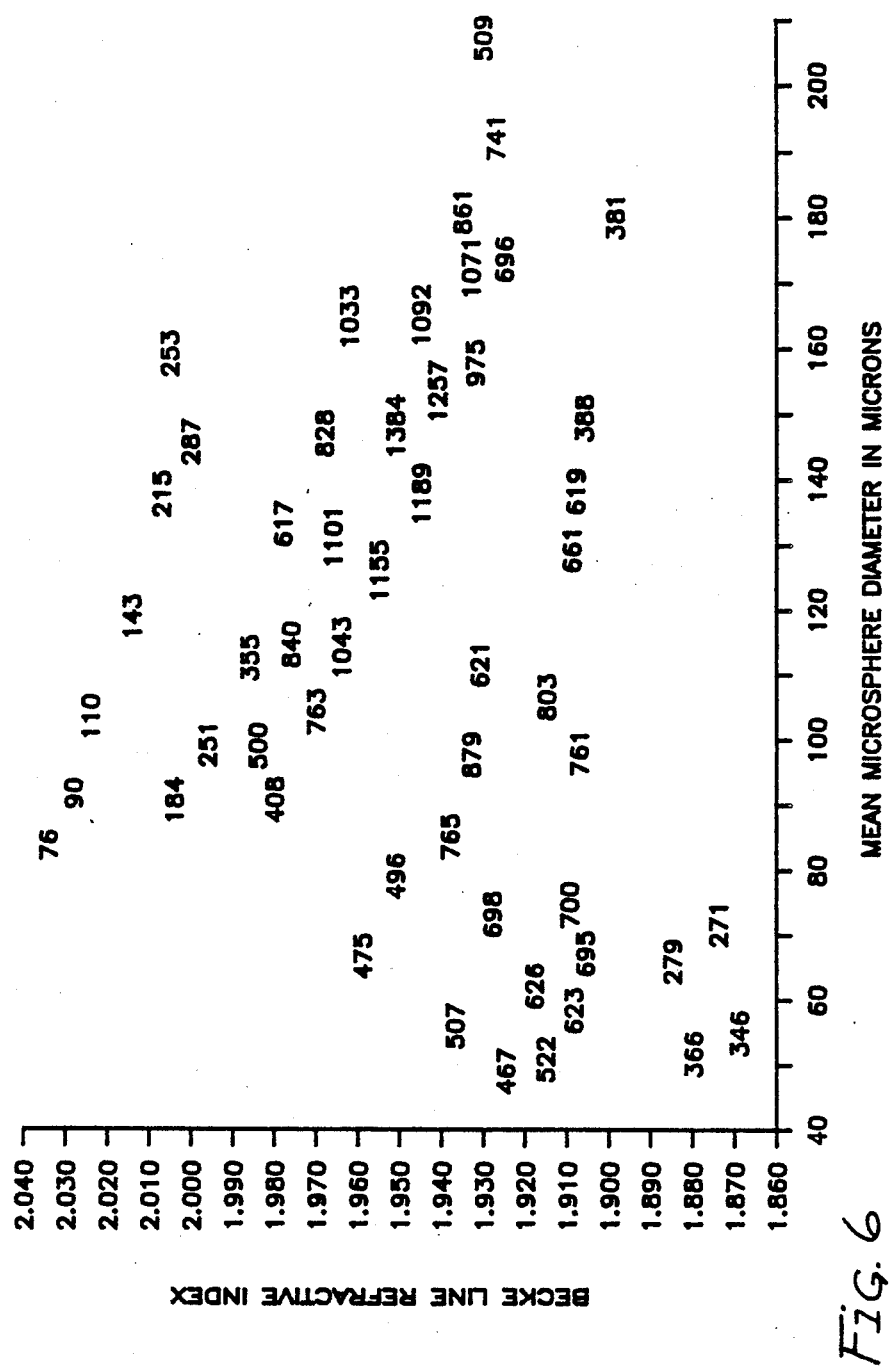
FIGS. 6-9 are graphical illustrations at divergence angles of 0.10°, 0.15°, 0.20°, and 0.25°, respectively of the effects of average index of refraction and average diameter of microspheres upon the retroreflective brightness of retroreflective articles made with such microspheres as observed in Examples 2 and 3.
Figure 7:
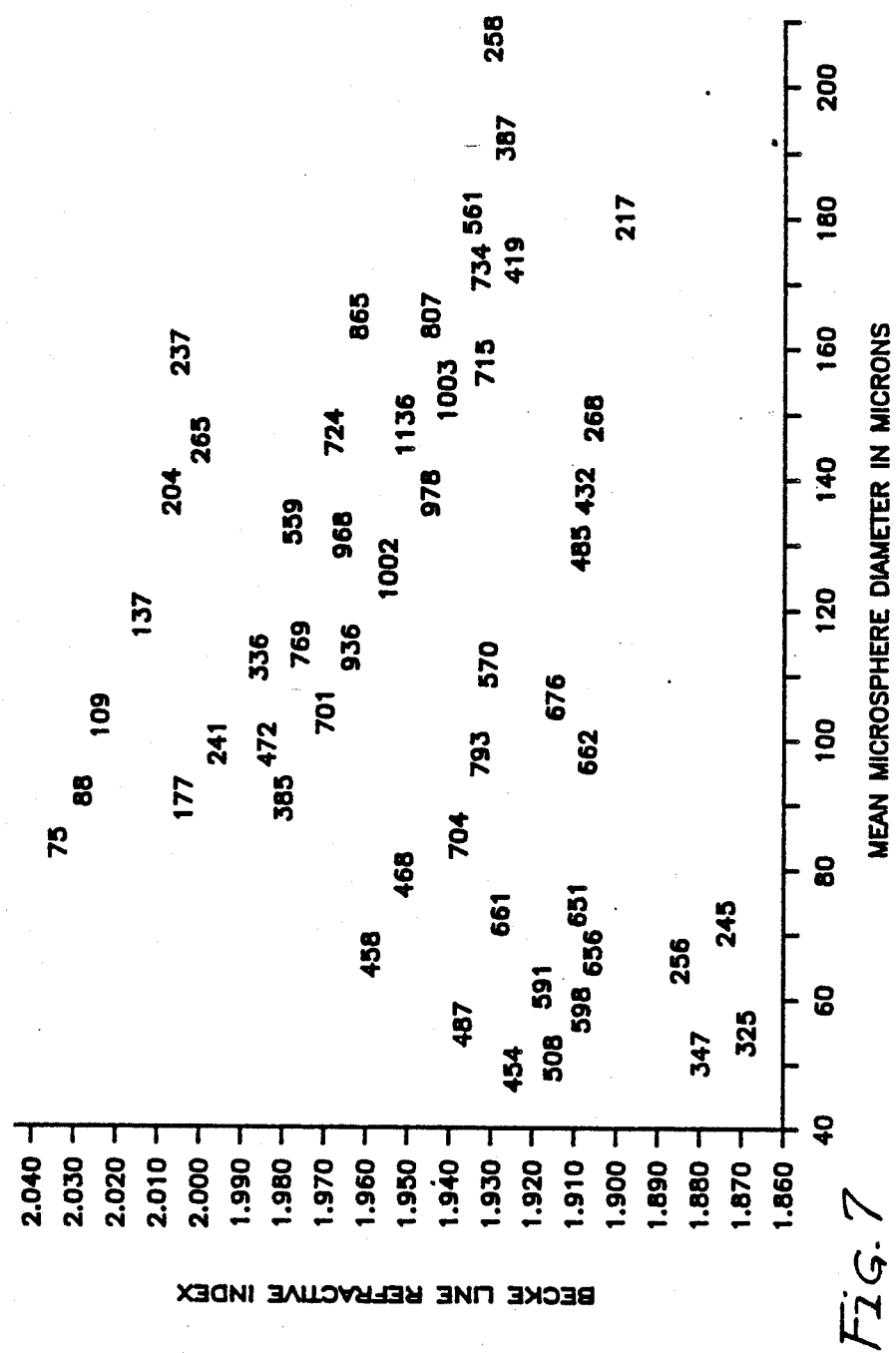
Figure 8:
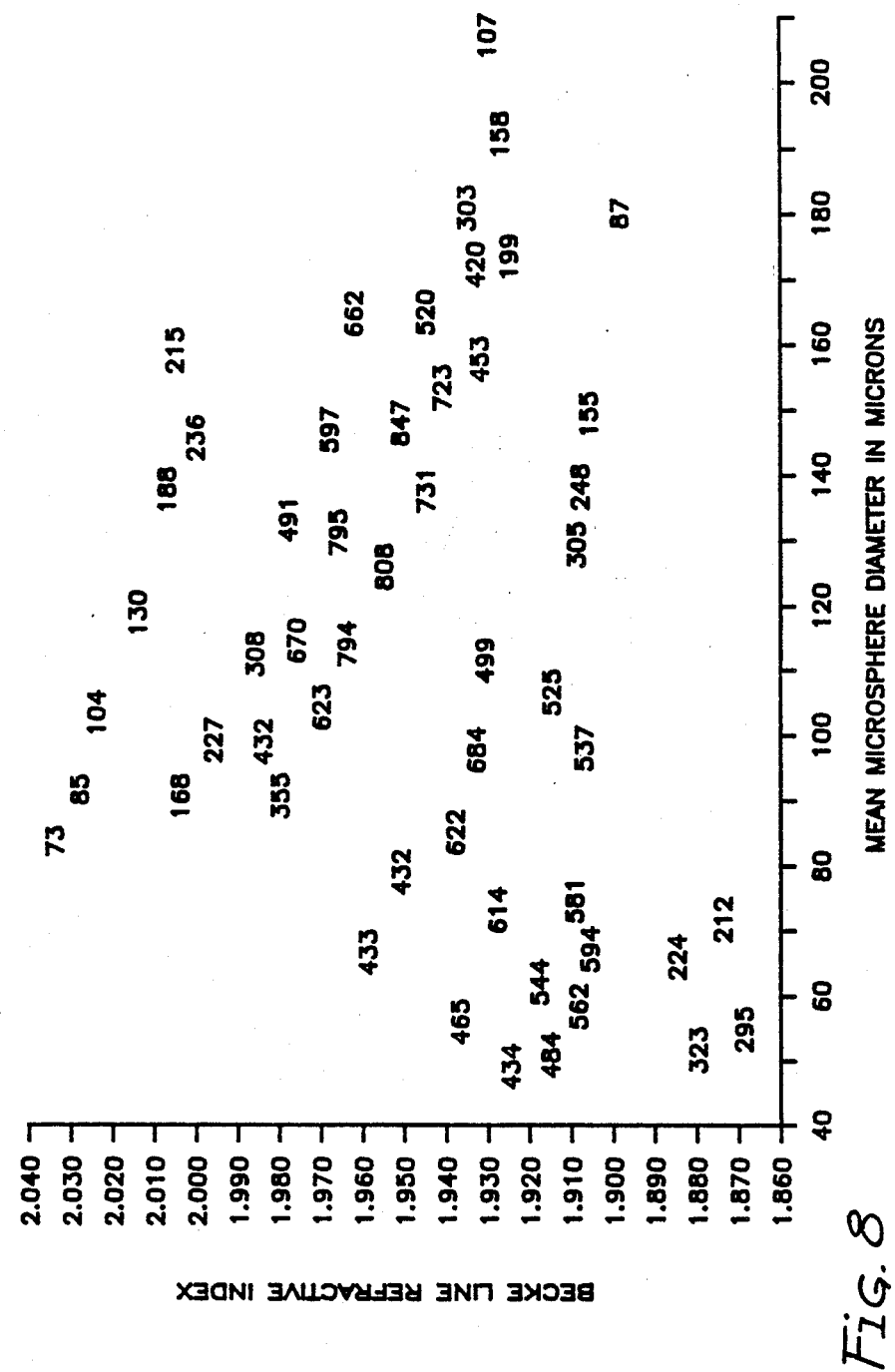
Figure 9:
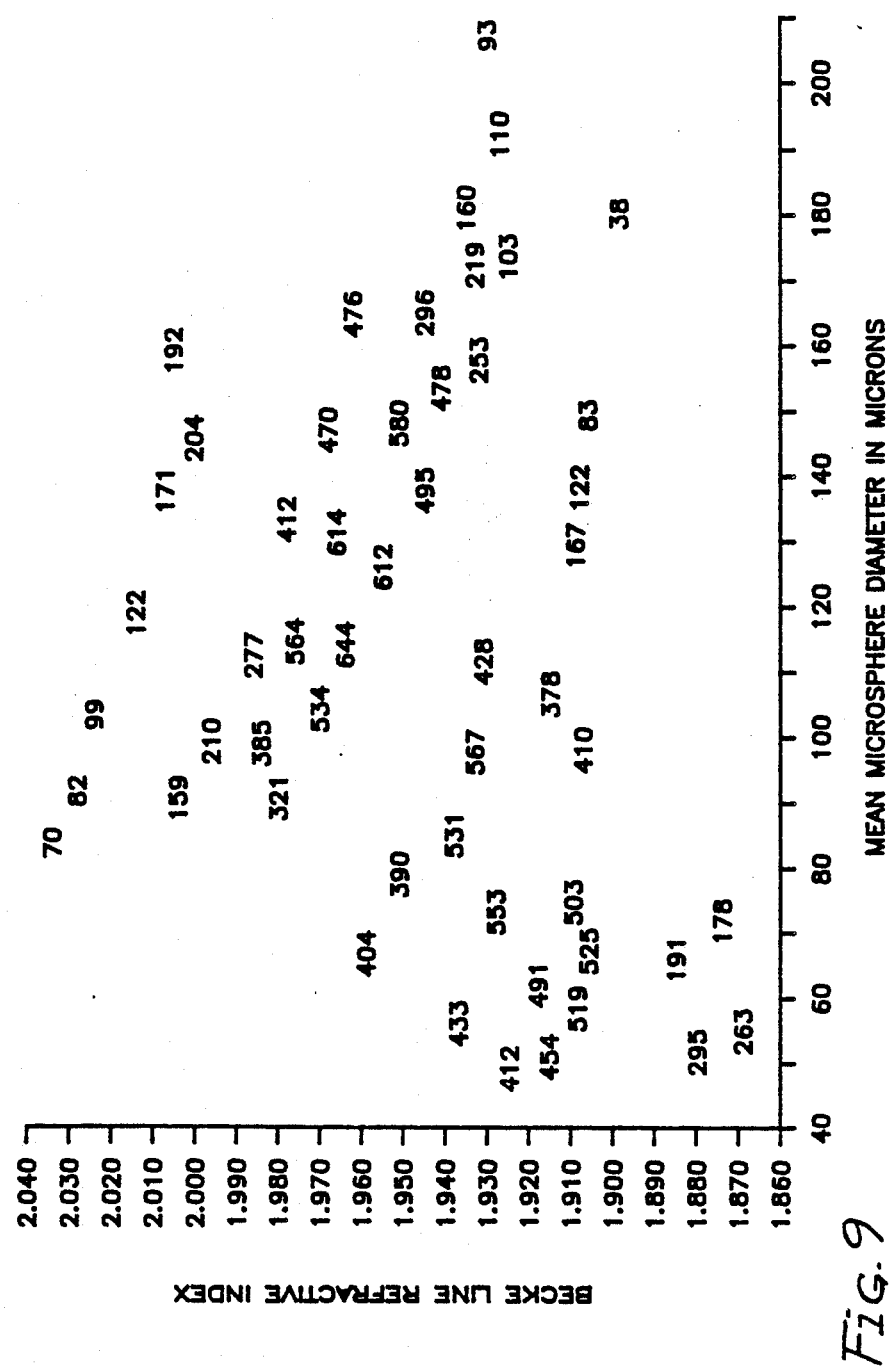

The present invention may be used to make coating compositions for forming retroreflective coatings, e.g., compositions comprising (1) transparent microspheres having substantially hemispheric reflectors thereon, (2) binder material, and (3) volatilizing agent, wherein the microspheres have an average refractive index of at least about 1.915 and an average diameter of at least about 75 microns, the average refractive index and the average diameter corresponding to the coordinates of a point within region D of FIG. 5.

Figure 12:
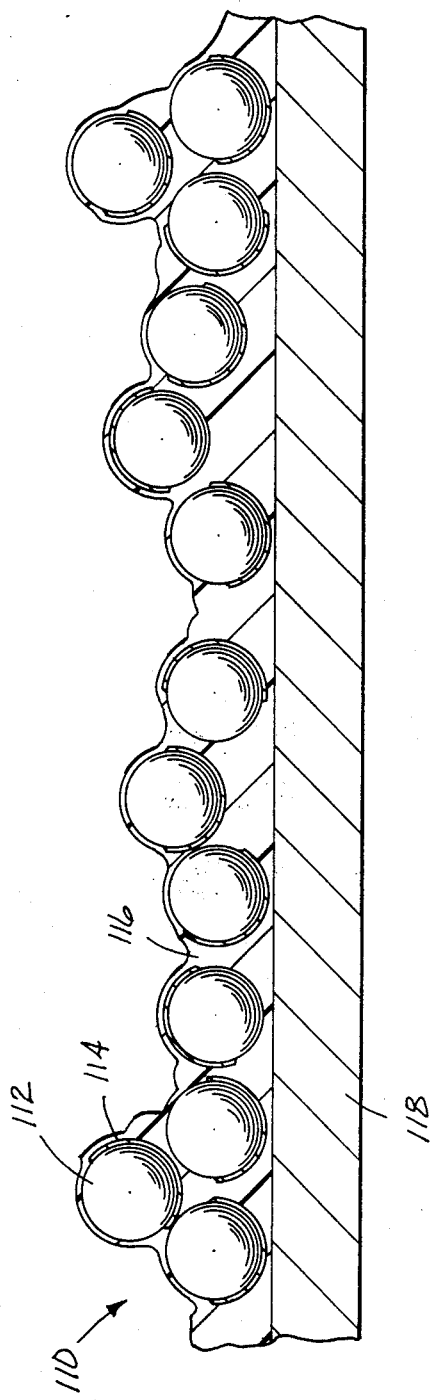
FIG. 12 is a cross-sectional illustration of a portion of an illustrative embodiment of retroreflective article of the invention wherein the microspheres are arranged in multi-layer fashion.

FIG. 12 shows article 110 which comprises microspheres 112 having dielectric reflectors 114, e.g., as disclosed in the aforementioned U.S. Pat. No. 3,700,305, thereon wherein at least a portion of microspheres 112 are arranged in multi-layer fashion in binder 116 on substrate 118.

Glossary:

Unless otherwise indicated, the following terms have the indicated meanings as used herein.

"Observation angle" or "divergence angle", illustrated as angle $\alpha$ in FIG. 1, is the angle between the axis of the light from the source to a target microsphere and the axis between the target microsphere and the observer or detector.

"Brightness" means the specific intensity of retroreflected light per unit area of retroreflective surface per unit of incident light and is expressed in candelas per lux per square meter.

"Divergence profile" is a graphical representation of the relationship between retroreflective brightness and divergence angle of a retroreflective article FIG. 4 is an example thereof.

"Mean microsphere diameter" is the average diameter of microspheres based on weight.

"Microsphere diameter range" is a measure of the magnitude of the microsphere distribution according to size. It is defined herein as the difference in microns between the diameters of the 5th and 95th cumulative percentiles, based on weight, of the microsphere population. The 5th percentile is the diameter at which 5 percent by weight of the microspheres are larger in diameter, and the 95th percentile is the diameter at which 95 percent by weight of the microspheres are larger in diameter.

"Diameter percent range" is the microsphere diameter range divided by the mean diameter, with the resulting value expressed as a percent. Thus, a sample of mean diameter of about 50 microns and a microsphere diameter range of about 25 microns has a diameter percent range of about 50 percent.

Examples

The invention will be further explained by the following illustrative examples which are intended to be nonlimiting.

Except as otherwise indicated, the following test procedures were used to evaluate the microsphere-based retroreflective articles discussed in the Examples.

Index of Refraction

The average index of refraction of a group of microspheres samples was determined by culling a representative sample of about 100 microspheres from the group, breaking the microspheres into pieces, and then measuring the refractive index thereof according to the Becke Line Method which is described by Walter McCrone et al. in *Polarized Light Microscopy*, McCrone Research Institute, Chicago, Ill.

Average Diameter of Microspheres

The average diameter of a group of microspheres was determined by culling a representative sample of microspheres from the group, scattering them on a microscope slide and measuring the diameter of the microspheres against a calibrated microscope grating under a microscope. The values obtained for 500 individual microspheres were then averaged to provide the average for the subject group.

Retroreflective Brightness

Retroreflective brightness was measured using a retroluminometer as described in U.S. defensive publication T987,003 at the indicated divergence angles and at entrance angles of −4°. A useful device is described in U.S. Fed. Std. 370, LS-300 Series, FP-74 Series which can be operated in the conformity with the comparative procedure described as Procedure II in U.S. Fed. Std. 370, dated March 1, 1977.

Example 1

An exposed-lens, i.e., no cover film, retroreflective sheeting, referred herein to as Sheeting I, was made in accordance with conventional principles using microspheres having an average diameter of about 62 microns, an average refractive index of about 1.912, and a diameter percent range of about 42 percent. The retroreflective brightness of this sheeting at observation angles of 0.1°, 0.3°, and 0.5°, in candela per lux per meter$^2$, is tabulated in Table 1 below. Curve F of FIG. 4 illustrates the divergence profile for Sheeting I.

An exposed-lens sheeting of the invention, referred to herein as Sheeting II, was made with microspheres having an average diameter of about 98 microns, an average refractive index of about 1.933, and a diameter percent range of about 21 percent. The retroreflective brightness of this sheeting at observation angles of 0.1°, 0.3°, and 0.5°, in candela per lux per meter$^2$, is tabulated in Table 1 below. Curve G of FIG. 4 illustrates the divergence profile of Sheeting II.

A different embodiment of an exposed-lens sheeting of the invention, referred to herein as Sheeting III, was made with microspheres having an average diameter of about 148 microns, an average refractive index of about 1.951, and a diameter percent range of about 13 percent. The retroreflective brightness of this sheeting at observation angles of 0.1°, 0.3°, and 0.5°, in candela per lux per meter$^2$, is tabulated in Table 1 below. Curve H of FIG. 4 illustrates the divergence profile of Sheeting III.

TABLE I

| Sheeting | Observation Angle | | |
|---|---|---|---|
| | 0.1° | 0.3° | 0.5° |
| I | 625 | 435 | 200 |
| II | 880 | 450 | 95 |
| III | 1385 | 355 | 72 |

Example 2

The retroreflective brightness of exposed-lens spreads of samples of microspheres having different average diameters, average refractive indices, and percent ranges were measured. In each of the samples listed in Table 2, spreads were prepared by arranging microspheres with the indicated characteristics in a monolayer on a polyethylene coated paper carrier web and heating to partially embed the microspheres in the web in accordance with standard techniques. An aluminum vapor coat was then applied to the exposed, i.e., rear, surfaces of the microspheres. The microspheres were then transferred to a binder layer with standard techniques and the carrier web stripped away to expose the front surfaces of the microspheres.

The characteristics of the subject microspheres and retroreflective results obtained are tabulated in Table 2.

TABLE 2

| No. | Size[1] | % R[2] | Index[3] | F[4] | Retroreflective Brightness[5] | | | | |
|---|---|---|---|---|---|---|---|---|---|
| | | | | | 0.10° | 0.15° | 0.20° | 0.25° | 0.50° |
| 1 | 62.0 | 42 | 1.918 | 1 | 626 | 591 | 544 | 491 | 199 |
| 2 | 144.9 | 12 | 1.903 | 1 | 566 | 376 | 202 | 94 | 200 |
| 3 | 138.2 | 8 | 1.908 | 1 | 619 | 432 | 248 | 122 | 224 |
| 4 | 132.9 | 8 | 1.908 | 1 | 635 | 456 | 274 | 142 | 221 |
| 5 | 129.3 | 8 | 1.909 | 1 | 661 | 485 | 305 | 167 | 203 |
| 6 | 126.6 | 9 | 1.908 | 1 | 679 | 510 | 333 | 188 | 188 |
| 7 | 125.5 | 9 | 1.909 | 1 | 677 | 512 | 340 | 199 | 170 |
| 8 | 114.7 | 10 | 1.906 | 1 | 785 | 639 | 469 | 312 | 102 |
| 9 | 111.2 | 10 | 1.916 | 1 | 767 | 635 | 474 | 328 | 86 |
| 10 | 106.8 | 11 | 1.916 | 1 | 796 | 668 | 514 | 369 | 72 |
| 11 | 106.5 | 11 | 1.915 | 1 | 803 | 676 | 525 | 378 | 68 |
| 12 | 104.4 | 13 | 1.921 | 1 | 821 | 695 | 548 | 404 | 66 |
| 13 | 207.2 | 9 | 1.930 | 3* | 509 | 258 | 107 | 93 | 123 |
| 14 | 193.3 | 12 | 1.932 | 3* | 682 | 393 | 181 | 108 | 218 |
| 15 | 180.9 | 15 | 1.935 | 3* | 861 | 561 | 303 | 160 | 267 |
| 16 | 168.7 | 11 | 1.941 | 3* | 1025 | 733 | 443 | 239 | 243 |
| 17 | 164.9 | 12 | 1.945 | 3* | 1092 | 807 | 520 | 296 | 210 |
| 18 | 158.8 | 10 | 1.939 | 3* | 1246 | 957 | 650 | 393 | 170 |
| 19 | 153.3 | 11 | 1.941 | 3* | 1257 | 1003 | 723 | 478 | 104 |
| 20 | 145.9 | 10 | 1.949 | 3* | 1262 | 1042 | 792 | 554 | 63 |
| 21 | 140.0 | 10 | 1.953 | 3* | 1202 | 1022 | 806 | 591 | 45 |
| 22 | 134.9 | 12 | 1.956 | 3* | 1092 | 948 | 772 | 589 | 46 |
| 23 | 131.2 | 13 | 1.966 | 3* | 1101 | 968 | 795 | 614 | 58 |
| 24 | 118.9 | 14 | 1.971 | 3* | 908 | 813 | 706 | 581 | 96 |
| 25 | 110.3 | 11 | 1.973 | 3* | 723 | 664 | 589 | 503 | 128 |
| 26 | 102.9 | 11 | 1.976 | 3* | 603 | 558 | 502 | 442 | 145 |
| 27 | 98.9 | 10 | 1.984 | 3* | 500 | 472 | 432 | 385 | 146 |
| 28 | 182.7 | 12 | 1.926 | 2* | 618 | 343 | 147 | 85 | 180 |
| 29 | 173.5 | 9 | 1.925 | 2* | 696 | 419 | 199 | 103 | 258 |
| 30 | 164.1 | 10 | 1.926 | 2* | 830 | 561 | 312 | 161 | 290 |
| 31 | 157.7 | 10 | 1.932 | 2* | 975 | 715 | 453 | 253 | 247 |
| 32 | 145.7 | 9 | 1.940 | 2* | 1123 | 882 | 615 | 385 | 166 |
| 33 | 137.7 | 10 | 1.945 | 2* | 1189 | 978 | 731 | 495 | 95 |
| 34 | 131.0 | 9 | 1.949 | 2* | 1160 | 994 | 783 | 572 | 56 |
| 35 | 125.9 | 9 | 1.955 | 2* | 1155 | 1002 | 808 | 612 | 49 |
| 36 | 118.8 | 8 | 1.960 | 2* | 1115 | 978 | 820 | 645 | 61 |
| 37 | 114.0 | 8 | 1.964 | 2* | 1043 | 936 | 794 | 644 | 79 |
| 38 | 110.1 | 8 | 1.967 | 2* | 996 | 871 | 756 | 627 | 100 |
| 39 | 104.2 | 11 | 1.970 | 2* | 763 | 701 | 623 | 534 | 127 |
| 40 | 96.6 | 9 | 1.972 | 2* | 560 | 521 | 473 | 417 | 136 |
| 41 | 90.6 | 9 | 1.980 | 2* | 408 | 385 | 355 | 321 | 127 |
| 42 | 85.1 | 9 | 1.984 | 2* | 357 | 340 | 316 | 290 | 132 |
| 43 | 80.5 | 9 | 1.985 | 2* | 325 | 310 | 291 | 267 | 137 |
| 44 | 76.8 | 8 | 1.988 | 2* | 301 | 289 | 272 | 252 | 137 |
| 45 | 148.0 | 13 | 1.951 | 5* | 1384 | 1136 | 847 | 580 | 72 |
| 46 | 138.1 | 11 | 1.963 | 5* | 1298 | 1107 | 883 | 656 | 40 |
| 47 | 129.5 | 9 | 1.968 | 5* | 1162 | 1027 | 851 | 676 | 57 |
| 48 | 121.9 | 10 | 1.970 | 5* | 1002 | 897 | 767 | 627 | 86 |
| 49 | 114.5 | 10 | 1.976 | 5* | 840 | 769 | 670 | 564 | 115 |
| 50 | 107.1 | 8 | 1.978 | 5* | 705 | 651 | 582 | 503 | 135 |
| 51 | 192.2 | 11 | 1.927 | 5* | 741 | 387 | 158 | 110 | 195 |
| 52 | 182.0 | 13 | 1.930 | 5* | 891 | 547 | 271 | 145 | 286 |
| 53 | 172.2 | 13 | 1.933 | 5* | 1071 | 734 | 420 | 219 | 286 |
| 54 | 163.0 | 14 | 1.939 | 5* | 1267 | 938 | 608 | 354 | 211 |
| 55 | 155.2 | 14 | 1.945 | 5* | 1335 | 1046 | 731 | 457 | 143 |
| 56 | 147.4 | 12 | 1.956 | 5* | 1374 | 1115 | 833 | 563 | 74 |
| 57 | 133.2 | 14 | 1.978 | 2* | 617 | 559 | 491 | 412 | 95 |
| 58 | 124.3 | 12 | 1.985 | 2* | 467 | 431 | 387 | 340 | 110 |
| 59 | 112.4 | 13 | 1.986 | 2* | 355 | 336 | 308 | 277 | 117 |
| 60 | 104.7 | 7 | 1.992 | 2* | 306 | 290 | 271 | 248 | 122 |
| 61 | 99.2 | 8 | 1.996 | 2* | 251 | 241 | 227 | 210 | 113 |
| 62 | 93.5 | 8 | 1.999 | 2* | 219 | 211 | 200 | 188 | 106 |
| 63 | 90.5 | 7 | 2.004 | 2* | 184 | 177 | 168 | 159 | 95 |
| 64 | 176.0 | 17 | 1.957 | 2* | 1059 | 855 | 628 | 423 | 72 |
| 65 | 164.7 | 13 | 1.962 | 2* | 1033 | 865 | 662 | 476 | 57 |
| 66 | 154.2 | 11 | 1.966 | 2* | 934 | 805 | 642 | 488 | 58 |
| 67 | 146.9 | 9 | 1.968 | 2* | 828 | 724 | 597 | 470 | 68 |
| 68 | 141.5 | 9 | 1.971 | 2* | 734 | 658 | 560 | 457 | 81 |
| 69 | 137.6 | 10 | 2.007 | 2* | 215 | 204 | 188 | 171 | 85 |
| 70 | 128.2 | 10 | 2.010 | 2* | 176 | 168 | 159 | 147 | 83 |
| 71 | 118.7 | 11 | 2.014 | 2* | 143 | 137 | 130 | 122 | 76 |
| 72 | 109.7 | 8 | 2.022 | 2* | 123 | 119 | 115 | 108 | 72 |
| 73 | 103.3 | 7 | 2.024 | 2* | 110 | 109 | 104 | 99 | 69 |
| 74 | 97.2 | 8 | 2.024 | 2* | 99 | 97 | 93 | 89 | 65 |
| 75 | 91.6 | 8 | 2.028 | 2* | 90 | 88 | 85 | 82 | 61 |
| 76 | 87.1 | 7 | 2.030 | 2* | 83 | 81 | 80 | 77 | 58 |
| 77 | 83.6 | 7 | 2.034 | 2* | 76 | 75 | 73 | 70 | 55 |
| 78 | 81.1 | 7 | 2.030 | 2* | 71 | 70 | 68 | 66 | 52 |
| 79 | 76.9 | 7 | 2.041 | 2* | 64 | 64 | 62 | 60 | 48 |

TABLE 2-continued

| No. | Size[1] | % R[2] | Index[3] | F[4] | Retroreflective Brightness[5] 0.10° | 0.15° | 0.20° | 0.25° | 0.50° |
|---|---|---|---|---|---|---|---|---|---|
| 80 | 141.5 | 9 | 1.998 | 2* | 316 | 287 | 252 | 215 | 70 |
| 81 | 145.6 | 11 | 2.000 | 2* | 287 | 265 | 236 | 204 | 75 |
| 82 | 150.4 | 15 | 2.003 | 2* | 263 | 244 | 222 | 195 | 80 |
| 83 | 159.0 | 17 | 2.005 | 2* | 253 | 237 | 215 | 192 | 85 |
| 84 | 170.9 | 12 | 2.007 | 2* | 228 | 216 | 198 | 181 | 85 |
| 85 | 73.8 | 9 | 1.908 | 1 | 702 | 651 | 578 | 492 | 114 |
| 86 | 70.6 | 14 | 1.903 | 1 | 703 | 657 | 591 | 516 | 141 |
| 87 | 67.1 | 15 | 1.906 | 1 | 695 | 656 | 594 | 525 | 171 |
| 88 | 64.8 | 17 | 1.911 | 1 | 674 | 639 | 591 | 529 | 196 |
| 89 | 62.8 | 16 | 1.915 | 1 | 662 | 625 | 581 | 527 | 216 |
| 90 | 60.4 | 16 | 1.905 | 1 | 644 | 616 | 574 | 524 | 237 |
| 91 | 58.3 | 19 | 1.909 | 1 | 623 | 598 | 562 | 519 | 250 |
| 92 | 56.6 | 18 | 1.909 | 1 | 596 | 572 | 539 | 500 | 257 |
| 93 | 54.5 | 22 | 1.919 | 1 | 565 | 547 | 518 | 482 | 263 |
| 94 | 53.0 | 23 | 1.917 | 1 | 545 | 529 | 504 | 472 | 267 |
| 95 | 50.8 | 18 | 1.915 | 1 | 522 | 508 | 484 | 454 | 270 |
| 96 | 50.3 | 18 | 1.923 | 1 | 485 | 471 | 453 | 427 | 261 |
| 97 | 49.0 | 15 | 1.925 | 1 | 467 | 454 | 434 | 412 | 261 |
| 98 | 47.3 | 19 | 1.922 | 1 | 437 | 425 | 409 | 390 | 253 |
| 99 | 105.4 | 9 | 1.908 | 1 | 726 | 617 | 480 | 342 | 64 |
| 100 | 101.5 | 11 | 1.903 | 1 | 741 | 636 | 499 | 369 | 56 |
| 101 | 98.0 | 14 | 1.907 | 1 | 761 | 662 | 537 | 410 | 50 |
| 102 | 94.8 | 11 | 1.908 | 1 | 784 | 695 | 579 | 457 | 55 |
| 103 | 86.3 | 12 | 1.908 | 1 | 810 | 726 | 620 | 504 | 69 |
| 104 | 83.1 | 12 | 1.908 | 1 | 817 | 754 | 648 | 536 | 86 |
| 105 | 80.3 | 13 | 1.911 | 1 | 813 | 742 | 652 | 549 | 103 |
| 106 | 78.1 | 13 | 1.913 | 1 | 786 | 726 | 641 | 548 | 117 |
| 107 | 74.6 | 15 | 1.910 | 1 | 700 | 651 | 581 | 503 | 125 |
| 108 | 65.3 | 30 | 1.886 | 1 | 289 | 264 | 234 | 202 | 72 |
| 109 | 65.9 | 48 | 1.885 | 1 | 279 | 256 | 224 | 191 | 69 |
| 110 | 69.8 | 38 | 1.880 | 1 | 274 | 249 | 217 | 184 | 66 |
| 111 | 71.7 | 31 | 1.874 | 1 | 271 | 245 | 213 | 178 | 62 |
| 112 | 68.6 | 24 | 1.874 | 1 | 282 | 255 | 225 | 188 | 59 |
| 113 | 65.6 | 18 | 1.873 | 1 | 288 | 264 | 231 | 195 | 57 |
| 114 | 61.8 | 15 | 1.872 | 1 | 301 | 276 | 243 | 210 | 60 |
| 115 | 60.1 | 13 | 1.872 | 1 | 322 | 297 | 265 | 232 | 72 |
| 116 | 56.7 | 13 | 1.876 | 1 | 328 | 306 | 275 | 244 | 80 |
| 117 | 54.8 | 12 | 1.869 | 1 | 346 | 325 | 295 | 263 | 95 |
| 118 | 53.9 | 13 | 1.879 | 1 | 349 | 329 | 303 | 273 | 106 |
| 119 | 52.9 | 13 | 1.878 | 1 | 362 | 342 | 315 | 282 | 118 |
| 120 | 52.5 | 16 | 1.877 | 1 | 369 | 348 | 323 | 292 | 125 |
| 121 | 51.6 | 18 | 1.880 | 1 | 366 | 347 | 323 | 295 | 136 |
| 122 | 49.8 | 21 | 1.874 | 1 | 358 | 340 | 320 | 292 | 140 |
| 123 | 84.7 | 9 | 1.928 | 1 | 687 | 640 | 572 | 498 | 133 |
| 124 | 73.8 | 10 | 1.931 | 1 | 727 | 682 | 621 | 551 | 178 |
| 125 | 73.1 | 10 | 1.928 | 1 | 698 | 661 | 614 | 553 | 212 |
| 126 | 66.6 | 13 | 1.928 | 1 | 644 | 615 | 573 | 524 | 233 |
| 127 | 62.3 | 15 | 1.931 | 1 | 580 | 556 | 525 | 485 | 240 |
| 128 | 58.9 | 17 | 1.940 | 1 | 522 | 504 | 473 | 440 | 235 |
| 129 | 55.9 | 18 | 1.937 | 1 | 507 | 487 | 465 | 433 | 245 |
| 130 | 53.8 | 16 | 1.930 | 1 | 480 | 460 | 437 | 414 | 241 |
| 131 | 53.5 | 16 | 1.930 | 1 | 449 | 438 | 420 | 396 | 240 |
| 132 | 50.3 | 18 | 1.930 | 1 | 414 | 403 | 387 | 367 | 230 |
| 133 | 48.0 | 18 | 1.936 | 1 | 384 | 373 | 359 | 340 | 221 |
| 134 | 46.2 | 19 | 1.930 | 1 | 350 | 342 | 328 | 314 | 211 |
| 135 | 140.1 | 48 | 1.904 | 1 | 609 | 575 | 528 | 472 | 181 |
| 136 | 111.9 | 42 | 1.920 | 1 | 506 | 440 | 360 | 285 | 104 |
| 137 | 111.5 | 52 | 1.931 | 1 | 658 | 561 | 440 | 321 | 78 |
| 138 | 111.5 | 52 | 1.931 | 1 | 679 | 582 | 459 | 340 | 81 |
| 139 | 111.5 | 52 | 1.931 | 1 | 621 | 570 | 499 | 428 | 133 |
| 140 | 109.4 | 27 | 1.931 | 1 | 846 | 745 | 619 | 483 | 72 |
| 141 | 103.2 | 17 | 1.931 | 1 | 893 | 798 | 669 | 542 | 79 |
| 142 | 103.2 | 17 | 1.931 | 1 | 899 | 807 | 680 | 548 | 80 |
| 143 | 97.7 | 21 | 1.933 | 1 | 879 | 793 | 684 | 567 | 94 |
| 144 | 97.7 | 21 | 1.933 | 1 | 880 | 795 | 685 | 569 | 96 |
| 145 | 95.6 | 12 | 1.933 | 1 | 847 | 777 | 679 | 572 | 117 |
| 146 | 87.3 | 10 | 1.948 | 1 | 791 | 732 | 649 | 561 | 143 |
| 147 | 85.2 | 9 | 1.945 | 1 | 757 | 704 | 635 | 556 | 160 |
| 148 | 81.7 | 9 | 1.944 | 1 | 700 | 657 | 595 | 529 | 171 |
| 149 | 80.8 | 12 | 1.944 | 1 | 643 | 609 | 556 | 495 | 179 |
| 150 | 76.2 | 27 | 1.944 | 1 | 609 | 574 | 528 | 478 | 189 |
| 151 | 73.2 | 35 | 1.956 | 1 | 550 | 520 | 482 | 437 | 186 |
| 152 | 72.2 | 37 | 1.957 | 1 | 536 | 511 | 474 | 431 | 194 |
| 153 | 68.9 | 38 | 1.961 | 1 | 490 | 468 | 440 | 405 | 192 |
| 154 | 68.1 | 43 | 1.959 | 1 | 406 | 390 | 367 | 338 | 168 |
| 155 | 68.1 | 43 | 1.959 | 1 | 464 | 443 | 417 | 385 | 194 |
| 156 | 66.6 | 45 | 1.959 | 1 | 421 | 404 | 381 | 355 | 183 |
| 157 | 66.6 | 45 | 1.959 | 1 | 475 | 458 | 433 | 404 | 207 |
| 158 | 197.4 | 15 | 1.899 | 1 | 177 | 87 | 31 | 22 | 17 |
| 159 | 180.1 | 15 | 1.899 | 1 | 381 | 217 | 87 | 38 | 55 |
| 160 | 162.0 | 16 | 1.899 | 1 | N/A[6] | 249 | 116 | 51 | 92 |
| 161 | 149.3 | 21 | 1.906 | 1 | 388 | 268 | 155 | 83 | 130 |
| 162 | 149.3 | 21 | 1.906 | 1 | 416 | 282 | 159 | 86 | 146 |
| 163 | 131.5 | 18 | 1.920 | 1 | 499 | 393 | 278 | 182 | 121 |
| 164 | 121.2 | 15 | 1.920 | 1 | 642 | 531 | 402 | 286 | 85 |
| 165 | 110.5 | 12 | 1.927 | 1 | 839 | 724 | 577 | 435 | 69 |
| 166 | 103.4 | 10 | 1.927 | 1 | 862 | 760 | 628 | 493 | 66 |
| 167 | 97.9 | 10 | 1.933 | 1 | 888 | 800 | 683 | 555 | 83 |
| 168 | 91.5 | 11 | 1.938 | 1 | 814 | 734 | 635 | 533 | 100 |
| 169 | 85.0 | 12 | 1.938 | 1 | 765 | 704 | 622 | 531 | 123 |
| 170 | 89.1 | 11 | 1.936 | 1 | 677 | 627 | 564 | 491 | 135 |
| 171 | 81.9 | 11 | 1.936 | 1 | 595 | 557 | 508 | 450 | 143 |
| 172 | 79.7 | 16 | 1.938 | 1 | 543 | 511 | 470 | 420 | 152 |
| 173 | 78.9 | 22 | 1.951 | 1 | 496 | 468 | 432 | 390 | 158 |
| 174 | 72.3 | 26 | 1.948 | 1 | 468 | 442 | 410 | 372 | 164 |

[1]Average diameter in microns.
[2]Percent range.
[3]Average Becke Line refractive index.

Example 3

The retroreflective brightness of exposed-lens spreads of sample of microspheres having different average diameters, average refractive indices, and percent ranges were measured. In each of the samples listed in Table 3, spreads were prepared as Example 2, except the reflectors were formed by applying a binder composition containing reflective particles over the microspheres instead of an aluminum vapor coat.

The characteristics of the subject microspheres and retroreflective results obtained are tabulated in Table 3.

TABLE 3

| No. | Size[1] | % R[2] | Index[3] | F[4] | Retroreflective Brightness[5] 0.10° | 0.15° | 0.20° | 0.25° | 0.50° |
|---|---|---|---|---|---|---|---|---|---|
| 1 | 144.9 | 12 | 1.903 | 1 | 27.6 | 22.1 | 17.2 | 13.9 | 12.6 |
| 2 | 138.2 | 8 | 1.908 | 1 | 28.1 | 23.0 | 18.1 | 14.3 | 12.4 |
| 3 | 132.9 | 8 | 1.908 | 1 | 27.5 | 22.8 | 17.8 | 14.3 | 11.7 |
| 4 | 129.3 | 8 | 1.909 | 1 | 28.2 | 24.1 | 19.1 | 15.2 | 11.6 |
| 5 | 126.6 | 9 | 1.908 | 1 | 28.6 | 24.0 | 19.4 | 15.5 | 11.3 |
| 6 | 125.5 | 10 | 1.909 | 1 | 28.1 | 23.3 | 19.2 | 15.4 | 10.7 |
| 7 | 114.7 | 10 | 1.906 | 1 | 29.8 | 25.7 | 21.4 | 16.8 | 9.2 |
| 8 | 111.2 | 10 | 1.916 | 1 | 28.3 | 25.1 | 20.8 | 17.3 | 8.5 |
| 9 | 106.8 | 11 | 1.916 | 1 | 29.2 | 25.9 | 22.0 | 17.8 | 8.2 |
| 10 | 106.5 | 11 | 1.915 | 1 | 29.3 | 25.5 | 21.2 | 17.5 | 7.7 |
| 11 | 104.4 | 13 | 1.921 | 1 | 27.6 | 24.3 | 20.5 | 16.9 | 7.3 |
| 12 | 207.2 | 9 | 1.930 | 3* | 27.1 | 20.0 | 15.2 | 13.5 | 10.6 |
| 13 | 193.3 | 12 | 1.932 | 3* | 32.6 | 24.5 | 18.0 | 15.2 | 13.1 |
| 14 | 180.9 | 15 | 1.935 | 3* | 36.2 | 27.5 | 20.6 | 16.0 | 14.1 |
| 15 | 168.7 | 11 | 1.941 | 3* | 38.1 | 30.5 | 22.5 | 17.2 | 13.0 |
| 16 | 164.9 | 12 | 1.945 | 3* | 39.4 | 31.7 | 23.9 | 18.0 | 12.1 |
| 17 | 158.8 | 10 | 1.939 | 3* | 40.9 | 33.4 | 25.6 | 19.6 | 10.9 |
| 18 | 153.3 | 11 | 1.941 | 3* | 40.4 | 34.0 | 26.6 | 20.6 | 9.1 |
| 19 | 145.9 | 10 | 1.949 | 3* | 39.0 | 33.5 | 27.3 | 21.2 | 7.8 |
| 20 | 140.0 | 10 | 1.953 | 3* | 36.4 | 31.8 | 26.2 | 21.2 | 6.9 |
| 21 | 134.9 | 12 | 1.956 | 3* | 34. | 30.2 | 25.7 | 20.8 | 6.6 |
| 22 | 131.2 | 13 | 1.966 | 3* | 33.8 | 29.8 | 25.8 | 21.0 | 6.9 |
| 23 | 118.9 | 14 | 1.971 | 3* | 27.2 | 25.2 | 22.0 | 19.5 | 6.9 |
| 24 | 110.3 | 11 | 1.973 | 3* | 22.2 | 20.8 | 18.7 | 16.7 | 7.1 |
| 25 | 102.9 | 11 | 1.976 | 3* | 19.0 | 17.6 | 16.3 | 14.6 | 6.8 |
| 26 | 98.9 | 10 | 1.984 | 3* | 15.7 | 14.9 | 13.7 | 12.5 | 6.5 |
| 27 | 182.7 | 12 | 1.926 | 2* | 34.0 | 25.7 | 18.8 | 16.1 | 13.9 |
| 28 | 173.5 | 9 | 1.925 | 2* | 35.2 | 27.2 | 19.9 | 16.4 | 15.2 |
| 29 | 164.1 | 10 | 1.926 | 2* | 36.8 | 28.6 | 21.9 | 17.1 | 15.3 |
| 30 | 157.7 | 10 | 1.932 | 2* | 38.5 | 31.3 | 24.0 | 18.2 | 13.7 |
| 31 | 145.7 | 9 | 1.940 | 2* | 39.9 | 33.3 | 26.1 | 19.9 | 11.4 |
| 32 | 137.1 | 10 | 1.945 | 2* | 39.5 | 33.8 | 27.2 | 21.4 | 9.1 |
| 33 | 131.0 | 9 | 1.949 | 2* | 38.3 | 33.5 | 28.1 | 22.2 | 7.7 |
| 34 | 125.9 | 9 | 1.955 | 2* | 36.7 |  | 27.7 | 22.8 | 7.3 |
| 35 | 118.8 | 8 | 1.960 | 2* | 34.1 | 30.9 | 26.5 | 22.2 | 7.0 |
| 36 | 114.0 | 8 | 1.964 | 2* | 31.5 | 28.6 | 25.5 | 21.4 | 6.9 |
| 37 | 110.1 | 8 | 1.967 | 2* | 29.2 | 26.9 | 23.4 | 20.3 | 7.1 |
| 38 | 104.2 | 11 | 1.970 | 2* | 24.7 | 22.9 | 21.0 | 18.1 | 7.3 |

TABLE 3-continued

| No. | Size[1] | % R[2] | Index[3] | F[4] | \multicolumn{5}{c}{Retroreflective Brightness[5]} |
|---|---|---|---|---|---|---|---|---|---|
|  |  |  |  |  | 0.10° | 0.15° | 0.20° | 0.25° | 0.50° |
| 39 | 96.6 | 9 | 1.972 | 2* | 17.9 | 16.9 | 15.6 | 14.1 | 6.6 |
| 40 | 90.6 | 9 | 1.980 | 2* | 13.9 | 13.1 | 12.4 | 11.3 | 6.0 |
| 41 | 85.1 | 9 | 1.984 | 2* | 11.9 | 11.4 | 10.5 | 9.9 | 5.8 |
| 42 | 80.5 | 9 | 1.985 | 2* | 10.9 | 10.5 | 9.9 | 9.3 | 5.6 |
| 43 | 76.8 | 8 | 1.988 | 2* | 10.0 | 9.7 | 9.2 | 8.7 | 5.7 |
| 44 | 148.0 | 13 | 1.951 | 5* | 43.1 | 37.1 | 29.6 | 23.0 | 8.5 |
| 45 | 138.1 | 11 | 1.963 | 5* | 40.8 | 35.9 | 30.0 | 24.0 | 7.5 |
| 46 | 129.5 | 9 | 1.968 | 5* | 35.8 | 32.3 | 27.7 | 23.0 | 7.1 |
| 47 | 121.9 | 10 | 1.970 | 5* | 31.2 | 28.2 | 25.2 | 21.4 | 7.5 |
| 48 | 114.5 | 10 | 1.976 | 5* | 26.4 | 24.4 | 21.8 | 19.3 | 7.3 |
| 49 | 107.1 | 8 | 1.978 | 5* | 22.1 | 20.8 | 18.8 | 16.9 | 7.3 |
| 50 | 192.2 | 11 | 1.927 | 5* | 37.5 | 27.6 | 20.5 | 17.5 | 14.9 |
| 51 | 182.0 | 13 | 1.930 | 5* | 39.8 | 30.1 | 21.9 | 17.4 | 15.8 |
| 52 | 172.2 | 13 | 1.933 | 5* | 42.2 | 33.0 | 24.5 | 18.6 | 15.4 |
| 53 | 163.0 | 14 | 1.939 | 5* | 43.5 | 35.2 | 26.5 | 19.9 | 13.4 |
| 54 | 155.2 | 14 | 1.945 | 5* | 44.4 | 36.4 | 28.5 | 21.5 | 10.5 |
| 55 | 147.4 | 13 | 1.956 | 5* | 42.2 | 35.9 | 28.8 | 22.5 | 8.4 |
| 56 | 133.2 | 14 | 1.978 | 2* | 21.9 | 20.1 | 17.9 | 15.5 | 6.8 |
| 57 | 124.3 | 12 | 1.985 | 2* | 17.7 | 16.5 | 15.0 | 13.4 | 6.8 |
| 58 | 112.4 | 13 | 1.986 | 2* | 13.6 | 13.1 | 12.3 | 11.2 | 6.5 |
| 59 | 104.7 | 7 | 1.992 | 2* | 12.2 | 11.8 | 10.8 | 10.1 | 6.4 |
| 60 | 99.2 | 8 | 1.996 | 2* | 10.7 | 10.5 | 10.0 | 9.3 | 6.1 |
| 61 | 93.5 | 8 | 1.999 | 2* | 9.1 | 8.9 | 8.5 | 8.0 | 5.4 |
| 62 | 90.5 | 7 | 2.004 | 2* | 7.5 | 7.2 | 6.9 | 6.7 | 4.7 |
| 63 | 176.0 | 17 | 1.957 | 2* | 35.2 | 29.4 | 23.2 | 18.0 | 7.6 |
| 64 | 164.7 | 13 | 1.962 | 2* | 34.2 | 29.3 | 24.3 | 19.5 | 7.2 |
| 65 | 154.2 | 12 | 1.966 | 2* | 30.9 | 27.3 | 23.3 | 18.8 | 6.8 |
| 66 | 146.9 | 9 | 1.968 | 2* | 27.6 | 24.7 | 21.6 | 17.9 | 6.7 |
| 67 | 141.5 | 9 | 1.971 | 2* | 24.7 | 22.7 | 20.1 | 16.9 | 6.6 |
| 68 | 137.6 | 10 | 2.007 | 2* | 10.7 | 10.1 | 9.6 | 8.8 | 5.7 |
| 69 | 128.2 | 10 | 2.010 | 2* | 9.3 | 8.7 | 8.5 | 7.9 | 5.4 |
| 70 | 118.7 | 11 | 2.014 | 2* | 7.9 | 7.8 | 7.2 | 6.8 | 5.1 |
| 71 | 109.7 | 9 | 2.022 | 2* | 6.8 | 6.6 | 6.3 | 6.1 | 4.7 |
| 72 | 103.3 | 8 | 2.024 | 2* | 6.3 | 6.1 | 5.9 | 5.6 | 4.4 |
| 73 | 97.2 | 8 | 2.024 | 2* | 5.7 | 5.5 | 5.4 | 5.1 | 4.1 |
| 74 | 91.6 | 8 | 2.028 | 2* | 5.2 | 5.0 | 4.8 | 4.7 | 3.8 |
| 75 | 87.1 | 7 | 2.030 | 2* | 4.9 | 4.7 | 4.6 | 4.5 | 3.7 |
| 76 | 83.6 | 7 | 2.034 | 2* | 4.6 | 4.4 | 4.2 | 4.1 | 3.4 |
| 77 | 81.1 | 7 | 2.030 | 2* | 4.2 | 4.1 | 3.9 | 3.8 | 3.1 |
| 78 | 76.9 | 7 | 2.041 | 2* | 4.0 | 4.1 | 3.9 | 3.8 | 3.2 |
| 79 | 141.5 | 9 | 1.998 | 2* | 14.0 | 12.7 | 11.5 | 10.2 | 5.5 |
| 80 | 145.6 | 11 | 2.000 | 2* | 13.7 | 12.8 | 11.6 | 10.5 | 5.9 |
| 81 | 150.4 | 15 | 2.003 | 2* | 12.6 | 11.9 | 11.0 | 10.9 | 6.0 |
| 82 | 159.0 | 17 | 2.005 | 2* | 11.7 | 11.0 | 10.2 | 9.6 | 5.9 |
| 83 | 170.9 | 13 | 2.007 | 2* | 11.1 | 10.5 | 9.8 | 9.1 | 5.8 |
| 84 | 73.8 | 9 | 1.908 | 1 | 21.0 | 19.8 | 18.2 | 16.1 | 7.3 |
| 85 | 70.6 | 14 | 1.903 | 1 | 20.3 | 19.1 | 17.6 | 15.9 | 7.5 |
| 86 | 67.1 | 15 | 1.906 | 1 | 19.4 | 18.9 | 17.4 | 16.06 | 8.0 |
| 87 | 64.8 | 17 | 1.911 | 1 | 18.8 | 17.9 | 16.6 | 15.3 | 7.9 |
| 88 | 62.8 | 16 | 1.915 | 1 | 18.2 | 17.2 | 16.3 | 15.1 | 8.3 |
| 89 | 60.4 | 16 | 1.905 | 1 | 17.0 | 16.3 | 15.4 | 14.4 | 8.1 |
| 90 | 58.3 | 19 | 1.909 | 1 | 16.3 | 15.8 | 14.9 | 14.1 | 8.5 |
| 91 | 56.6 | 18 | 1.909 | 1 | 15.4 | 14.9 | 14.2 | 13.2 | 8.3 |
| 92 | 53.0 | 23 | 1.917 | 1 | 14.3 | 13.6 | 13.2 | 12.4 | 8.2 |
| 93 | 50.8 | 18 | 1.915 | 1 | 13.2 | 12.8 | 12.2 | 11.6 | 7.8 |
| 94 | 49.0 | 15 | 1.925 | 1 | 12.1 | 11.9 | 11.3 | 10.8 | 7.5 |
| 95 | 47.3 | 19 | 1.922 | 1 | 11.3 | 10.9 | 10.6 | 10.1 | 7.4 |
| 96 | 105.4 | 9 | 1.908 | 1 | 26.4 | 23.3 | 19.8 | 16.4 | 7.8 |
| 97 | 101.5 | 11 | 1.903 | 1 | 25.5 | 22.9 | 19.5 | 16.3 | 7.4 |
| 98 | 98.0 | 14 | 1.907 | 1 | 25.1 | 22.8 | 19.6 | 16.6 | 7.2 |
| 99 | 94.8 | 11 | 1.908 | 1 | 25.4 | 23.2 | 20.3 | 17.6 | 7.0 |
| 100 | 86.3 | 12 | 1.908 | 1 | 24.8 | 22.6 | 20.1 | 17.4 | 6.8 |
| 101 | 74.6 | 15 | 1.910 | 1 | 20.5 | 19.0 | 17.4 | 15.8 | 7.0 |
| 102 | 65.3 | 30 | 1.886 | 1 | 13.0 | 12.5 | 11.6 | 10.6 | 6.6 |
| 103 | 65.9 | 48 | 1.885 | 1 | 13.4 | 12.9 | 11.7 | 10.7 | 6.8 |
| 104 | 69.8 | 38 | 1.880 | 1 | 13.8 | 12.9 | 12.0 | 10.9 | 7.1 |
| 105 | 71.7 | 31 | 1.874 | 1 | 14.3 | 13.5 | 12.3 | 11.3 | 7.1 |
| 106 | 68.6 | 24 | 1.874 | 1 | 13.8 | 13.1 | 12.2 | 11.1 | 6.9 |
| 107 | 65.6 | 18 | 1.873 | 1 | 13.4 | 12.7 | 11.8 | 10.9 | 6.5 |
| 108 | 61.8 | 15 | 1.872 | 1 | 13.0 | 12.5 | 11.5 | 10.5 | 6.3 |
| 109 | 60.1 | 13 | 1.872 | 1 | 12.8 | 12.2 | 11.6 | 10.6 | 6.4 |
| 110 | 56.7 | 13 | 1.876 | 1 | 12.8 | 12.0 | 11.6 | 10.6 | 6.3 |
| 111 | 54.8 | 12 | 1.869 | 1 | 12.4 | 11.9 | 11.2 | 10.5 | 6.4 |
| 112 | 53.9 | 13 | 1.879 | 1 | 12.0 | 11.7 | 10.8 | 10.2 | 6.3 |
| 113 | 52.9 | 13 | 1.878 | 1 | 12.4 | 12.0 | 11.3 | 10.8 | 6.6 |
| 114 | 52.5 | 16 | 1.877 | 1 | 12.3 | 12.1 | 11.4 | 10.9 | 6.8 |
| 115 | 51.6 | 18 | 1.880 | 1 | 11.9 | 11.6 | 11.0 | 10.3 | 6.5 |
| 116 | 49.8 | 21 | 1.874 | 1 | 11.7 | 11.5 | 10.8 | 10.3 | 6.5 |
| 117 | 84.7 | 9 | 1.928 | 1 | 21.5 | 20.0 | 18.4 | 16.4 | 7.5 |
| 118 | 73.8 | 10 | 1.931 | 1 | 21.6 | 20.1 | 18.6 | 16.9 | 8.3 |
| 119 | 73.1 | 10 | 1.928 | 1 | 20.4 | 19.5 | 18.4 | 16.9 | 8.6 |
| 120 | 66.6 | 13 | 1.928 | 1 | 18.9 | 18.2 | 17.2 | 16.0 | 8.9 |
| 121 | 62.3 | 15 | 1.931 | 1 | 17.7 | 16.7 | 15.8 | 14.9 | 8.8 |
| 122 | 58.9 | 17 | 1.940 | 1 | 16.0 | 15.5 | 14.6 | 13.9 | 8.6 |
| 123 | 55.9 | 18 | 1.937 | 1 | 15.2 | 14.7 | 14.3 | 13.3 | 8.6 |
| 124 | 53.8 | 16 | 1.930 | 1 | 13.4 | 13.0 | 12.6 | 11.8 | 7.8 |
| 125 | 53.5 | 16 | 1.930 | 1 | 13.5 | 13.3 | 12.6 | 12.0 | 8.1 |
| 126 | 50.3 | 18 | 1.930 | 1 | 12.8 | 12.3 | 11.8 | 11.3 | 7.8 |
| 127 | 48.0 | 18 | 1.936 | 1 | 11.7 | 11.4 | 11.0 | 10.5 | 7.5 |
| 128 | 46.2 | 19 | 1.930 | 1 | 10.8 | 10.6 | 10.1 | 9.74 | 7.2 |
| 129 | 140.1 | 48 | 1.904 | 1 | 27.3 | 23.3 | 18.9 | 15.8 | 11.8 |
| 130 | 111.9 | 42 | 1.920 | 1 | 27.4 | 23.7 | 19.9 | 16.3 | 10.3 |
| 131 | 111.5 | 52 | 1.931 | 1 | 27.9 | 24.9 | 21.5 | 17.9 | 8.5 |
| 132 | 109.4 | 27 | 1.931 | 1 | 30.2 | 27.2 | 23.8 | 20.2 | 7.9 |
| 133 | 103.2 | 17 | 1.931 | 1 | 29.0 | 26.8 | 23.4 | 19.5 | 7.4 |
| 134 | 97.7 | 21 | 1.933 | 1 | 27.9 | 25.8 | 22.9 | 19.6 | 7.4 |
| 135 | 95.6 | 12 | 1.933 | 1 | 25.4 | 23.8 | 21.6 | 18.8 | 7.1 |
| 136 | 87.3 | 10 | 1.948 | 1 | 23.6 | 22.4 | 20.3 | 17.9 | 7.4 |
| 137 | 85.2 | 9 | 1.945 | 1 | 22.2 | 20.5 | 19.0 | 16.9 | 7.6 |
| 138 | 81.7 | 9 | 1.944 | 1 | 19.4 | 18.4 | 16.9 | 15.1 | 7.1 |
| 139 | 80.8 | 11 | 1.944 | 1 | 17.8 | 16.6 | 15.8 | 14.3 | 7.0 |
| 140 | 76.2 | 27 | 1.944 | 1 | 17.0 | 16.2 | 15.0 | 13.9 | 7.1 |
| 141 | 73.2 | 35 | 1.956 | 1 | 13.7 | 13.3 | 12.2 | 11.5 | 6.3 |
| 142 | 72.2 | 37 | 1.957 | 1 | 13.9 | 13.2 | 12.5 | 11.7 | 6.6 |
| 143 | 68.9 | 38 | 1.961 | 1 | 11.2 | 10.8 | 10.2 | 9.6 | 5.5 |
| 144 | 68.1 | 43 | 1.959 | 1 | 9.5 | 9.2 | 8.7 | 8.1 | 4.8 |
| 145 | 66.6 | 45 | 1.959 | 1 | 9.4 | 9.0 | 8.4 | 8.0 | 5.0 |
| 146 | 197.4 | 15 | 1.899 | 1 | 6.9 | 5.2 | 4.1 | 3.9* | 2.8 |
| 147 | 180.1 | 15 | 1.899 | 1 | 12.6 | 9.6 | 7.3 | 6.2 | 5.1 |
| 148 | 162.0 | 16 | 1.899 | 1 | 18.6 | 14.7 | 10.9 | 9.1 | 8.0 |
| 149 | 149.3 | 21 | 1.906 | 1 | 18.3 | 14.9 | 12.0 | 9.6 | 8.3 |
| 150 | 131.5 | 18 | 1.920 | 1 | 19.8 | 16.8 | 14.1 | 11.4 | 8.0 |
| 151 | 121.2 | 15 | 1.920 | 1 | 20.8 | 17.9 | 15.0 | 12.4 | 6.7 |
| 152 | 110.5 | 12 | 1.927 | 1 | 22.3 | 19.8 | 17.2 | 14.2 | 6.2 |
| 153 | 103.4 | 10 | 1.927 | 1 | 24.0 | 21.3 | 18.6 | 15.6 | 5.9 |
| 154 | 97.9 | 10 | 1.933 | 1 | 23.2 | 21.1 | 18.6 | 16.1 | 5.9 |
| 155 | 91.5 | 11 | 1.938 | 1 | 19.9 | 18.3 | 16.2 | 14.3 | 5.6 |
| 156 | 85.0 | 12 | 1.938 | 1 | 19.0 | 17.7 | 16.1 | 14.4 | 5.8 |
| 157 | 89.1 | 11 | 1.936 | 1 | 15.5 | 14.6 | 13.5 | 12.2 | 5.3 |
| 158 | 81.9 | 11 | 1.936 | 1 | 13.0 | 12.4 | 11.4 | 10.2 | 4.7 |
| 159 | 79.7 | 16 | 1.938 | 1 | 9.8 | 9.2 | 8.6 | 7.9 | 3.9 |
| 160 | 78.9 | 21 | 1.951 | 1 | 10.4 | 9.7 | 9.3 | 8.3 | 4.4 |
| 161 | 72.3 | 26 | 1.948 | 1 | 8.7 | 8.3 | 7.9 | 7.2 | 3.9 |

[1] Average diameter in microns.
[2] Percent range.
[3] Average Becke Line refractive index.
[4] Number of flame fusions. An asterisk indicates that the microspheres had also been heat treated by heating to about 635° C. for about 30 minutes.
[5] Retroreflective brightness in candela per lux per meter[2].

FIG. 5 was derived from the data in Table 2 and 3 above. Curves of substantially equal retroreflective brightness were plotted. Region A represents the region of at least 90 percent of maximum brightness, Region B represents the region of 80 percent of maximum brightness, Region C represents the region of 70 percent of maximum brightness, and Region D represents the region of 60 percent of maximum brightness, at observation angles of less than about 0.20°.

FIG. 11 was similarly derived from the data in Table 2 above, and the curve shown therein represents the region of 75 percent of maximum retroreflective brightness at observation angles of about 0.10°.

FIGS. 6–9 were prepared by plotting the measured retroreflective brightness at appropriate coordinates of average diameter and average refractive index for randomly selected samples from Table 2.

Various modifications and alterations of this invention will become apparent to those skilled in the art without departing from the scope and spirit of this invention.

What is claimed is:

1. A microsphere-based retroreflective article comprising transparent microspheres having reflectors in optical association with the rear surfaces thereof, wherein said microspheres are air-incident, and have an average refractive index of at least about 1.915 and an average diameter of at least about 75 microns, said average refractive index and said average diameter also corresponding to the coordinates of a point within region D of FIG. 5, and wherein said microspheres have a diameter percent range of about 30 percent or less.

2. The article of claim 1 wherein said microspheres have an average refractive index and an average diameter corresponding to the coordinates of a point within region C of FIG. 5.

3. The article of claim 1 wherein said microspheres have an average refractive index and an average diameter corresponding to the coordinates of a point within region B of FIG. 5.

4. The article of claim 1 wherein said microspheres have an average refractive index and an average diameter corresponding to the coordinates of a point within region A of FIG. 5.

5. The article of any one of claims 1–4 wherein said microspheres have a diameter percent range of about 20 percent or less.

6. The article of any one of claims 1–4 wherein said microspheres have a diameter percent range of about 10 percent or less.

7. The article of claim 1 wherein said article has an exposed-lens retroreflective brightness of at least about 800 candela per lux per meter$^2$ at a divergence angle of less than about 0.20°.

8. The article of claim 1 wherein said article has an exposed-lens retroreflective brightness of at least about 1000 candela per lux per meter$^2$ at a divergence angle of less than about 0.20°.

9. The article of claim 1 wherein said article has an exposed-lens retroreflective brightness of at least about 1300 candela per lux per meter$^2$ at a divergence angle of less than about 0.20°.

10. The article of claim 1 wherein said microspheres have an average refractive index between about 1.930 and about 1.950 and an average diameter between about 90 and about 170 microns.

11. The article of claim 10 wherein said article has an exposed-lens retroreflective brightness of at least about 800 candela per lux per meter$^2$ at divergence angle of less than about 0.20°.

12. The article of claim 1 wherein said reflectors are selected from at least one of the following: specular reflectors, dielectric reflectors, and diffuse reflectors.

13. The article of claim 12 wherein said reflectors are specular reflectors and said microspheres have an average refractive index of about 1.940 and an average diameter between about 98 and about 161 microns.

14. The article of claim 13 wherein said reflectors comprise at least one of aluminum or silver.

15. The article of claim 12 wherein said reflectors are diffuse reflectors and said microspheres have an average refractive index of about 1.940 and an average diameter between about 129 and about 164 microns.

16. The article of claim 1 wherein at least a portion of said article is substantially planar.

17. The article of claim 1 wherein at least a portion of said article is contoured.

18. The article of claim 1 wherein at least a portion of said microspheres are arranged in substantially a monolayer.

19. The article of claim 1 wherein at least a portion of said microspheres are arranged in multi-layer fashion.

20. The article of claim 1 wherein at least a portion of said article is of exposed-lens construction.

21. The article of claim 1 wherein at least a portion of said article is of encapsulated-lens construction.

22. The article of claim 1 wherein at least a portion of said microspheres have different optical orientations.

23. The article of claim 1 wherein said microspheres have substantially uniform optical orientations.

24. The article of claim 1 wherein said reflectors are diffuse reflectors and said article has an exposed-lens retroreflective brightness of at least about 30 candela per lux per meter$^2$ at a divergence angle of less than about 0.20°.

25. The article of claim 1 wherein said reflectors are diffuse reflectors and said article has an exposed-lens retroreflective brightness of at least about 45 candela per lux per meter$^2$ at a divergence angle of less than about 0.20°.

26. The article of claim 1 wherein said reflectors are dielectric reflectors and said article has an exposed-lens retroreflective brightness of at least about 300 candela per lux per meter$^2$.

27. The article of claim 1 wherein said reflectors are dielectric reflectors and said article has an exposed-lens retroreflective brightness of at least about 400 candela per lux per meter$^2$.

28. A coating composition for forming retroreflective coatings, said composition comprising (1) transparent microspheres having substantially hemispheric reflectors thereon, (2) binder material, and (3) a volatilizing agent, wherein said microspheres have an average refractive index of at least about 1.915 and an average diameter of at least about 75 microns, said average refractive index and said average diameter also corresponding to the coordinates of a point within region D of FIG. 5, and wherein said microspheres have a diameter percent range of about 30 percent or less.

29. A microsphere-based retroreflective article comprising transparent microspheres having reflectors in optical association with the rear surfaces thereof, wherein said microspheres are air-incident, and have an average refractive index of at least about 1.915 and an average diameter of at least about 75 microns, said average refractive index and said average diameter also corresponding to the coordinates of a point within region E of FIG. 11, and wherein said microspheres have a diameter percent range of about 30 percent or less.

30. A microsphere-based retroreflective article comprising transparent microspheres having reflectors in optical association with the rear surfaces thereof, wherein said microspheres are air-incident, and have an average refractive index between about 1.930 and about 1.950 and an average diameter between about 90 and about 170 microns, said article having an exposed-lens retroreflective brightness of at least about 800 candela per lux per meter$^2$ at a divergence angle of less than about 0.20°.

31. The article of claim 30 wherein said article has an exposed-lens retroreflect brightness of at least about 1000 candela per lux per meter$^2$.

32. The article of claim 30 wherein said article has an exposed-lens retroreflective brightness of at least about 1300 candela per lux per meter$^2$.

33. A microsphere-based retroreflective article having a surface region which comprises transparent microspheres having reflectors in optical association with the rear surfaces thereof, wherein said microspheres are air-incident, and have an average diameter between about 110 and about 200 microns and an average refractive index between about 1.915 and about 1.950, and wherein said microspheres have a diameter percent range of about 30 percent or less.

34. A variable contrast sign having a background area and a legend area wherein said background area comprises transparent microspheres having reflectors in optical association with the rear surfaces thereof, wherein said microspheres are air-incident, and have an average diameter between about 110 and about 200 microns and an average refractive index between about 1.915 and about 1.950, said background area and said legend area having different divergence profiles.

35. A microsphere-based retroreflective article comprising transparent microspheres having reflectors in optical association with the rear surfaces thereof, wherein said microspheres are air-incident, and have an average refractive index of at least about 1.915 and an average diameter of at least about 75 microns, said average refractive index and said average diameter also corresponding to the coordinates of a point within region D of FIG. 5.

36. The article of claim 35 wherein said microspheres have an average refractive index and an average diameter corresponding to the coordinates of a point within region C of FIG. 5.

37. The article of claim 35 wherein said microspheres have an average refractive index and an average diameter corresponding to the coordinates of a point within region B of FIG. 5.

38. The article of claim 35 wherein said microspheres have an average refractive index and an average diameter corresponding to the coordinates of a point within region A of FIG. 5.

* * * * *

UNITED STATES PATENT AND TRADEMARK OFFICE
CERTIFICATE OF CORRECTION

PATENT NO. : 4,957,335

DATED : September 18, 1990

INVENTOR(S) : Clark G. Kuney, Jr.

It is certified that error appears in the above-identified patent and that said Letters Patent is hereby corrected as shown below:

In Column 2, line 63, "surprizingly" should read --surprisingly--.

In Column 3, line 43, after the word "be" insert --arranged in multi-layer fashion and/or--.

In Column 5, line 17, delete the second word "and".

In Column 5, line 19, after the word "invention" add a semi-colon, and delete the words "which currently ends the line".

In Column 5, line 40, "essentionally" should read --essentially--.

In Column 20, line 20, insert the following:

--[4] Number of flame fusions. An asterisk indicates that the microspheres had also been heat treated by heating to about 635°C for about 30 minutes.

[5] Retroreflective brightness in candela per lux per meter$^2$.

[6] Not available, measurement malfunction.--

UNITED STATES PATENT AND TRADEMARK OFFICE
CERTIFICATE OF CORRECTION

PATENT NO. : 4,957,335

DATED : September 18, 1990

INVENTOR(S) : Clark G. Kuney, Jr.

It is certified that error appears in the above-identified patent and that said Letters Patent is hereby corrected as shown below:

In Column 24, line 61, "retroreflect" should read --retroreflective--.

Signed and Sealed this

Twenty-first Day of January, 1992

*Attest:*

HARRY F. MANBECK, JR.

*Attesting Officer*     *Commissioner of Patents and Trademarks*